US012677228B2

(12) United States Patent
Prasad et al.

(10) Patent No.: US 12,677,228 B2
(45) Date of Patent: Jul. 7, 2026

(54) LISTEN BEFORE TALK WITH PREAMBLE REPETITIONS

(71) Applicant: Ofinno, LLC, Reston, VA (US)

(72) Inventors: Gautham Prasad, Herndon, VA (US); Ali Cagatay Cirik, Chantilly, VA (US); Esmael Hejazi Dinan, McLean, VA (US); Hyoungsuk Jeon, Centreville, VA (US); Hua Zhou, Vienna, VA (US); Bing Hui, Nanjing (CN)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/058,628

(22) Filed: Feb. 20, 2025

(65) Prior Publication Data

US 2025/0193809 A1 Jun. 12, 2025

Related U.S. Application Data

(63) Continuation of application No. PCT/US2024/014737, filed on Feb. 7, 2024.
(Continued)

(51) Int. Cl.
*H04W 52/36* (2009.01)
*H04L 1/08* (2006.01)
(Continued)

(52) U.S. Cl.
CPC ............. *H04W 52/367* (2013.01); *H04L 1/08* (2013.01); *H04L 5/0048* (2013.01); *H04W 74/0833* (2013.01); *H04W 74/0808* (2013.01)

(58) Field of Classification Search
CPC ........... H04W 52/367; H04W 74/0833; H04W 74/0808; H04L 1/08; H04L 5/0048
See application file for complete search history.

(56) References Cited

U.S. PATENT DOCUMENTS 12,052,761 B2 7/2024 Zhou et al.
2018/0279376 A1* 9/2018 Dinan ............... H04W 74/0836
(Continued)

FOREIGN PATENT DOCUMENTS

EP 3 780 871 A1 2/2021
EP 3 373 667 B1 11/2021
(Continued)

OTHER PUBLICATIONS

ZTE: "FL Summary #2 of Procedure for 2-steps RACH", 3GPP Draft; R1-1913414, 3rd Generation Partnership Project (3GPP), vol. RAN WG1, No. Nov. 18, 2019-Nov. 22, 2019 Nov. 25, 2019 (Nov. 25, 2019), XP051830693. (Year: 2019).*
(Continued)

*Primary Examiner* — John J Lee
(74) *Attorney, Agent, or Firm* — Peter Flanagan; Kavon Nasabzadeh; Jacob L. Mangan

(57) ABSTRACT

A method can include determining, by a wireless device, a first plurality of repetitions of a first preamble scheduled for transmission for a random-access procedure. The method can also include suspending, by a wireless device, a power-ramping counter of a random-access procedure based on not transmitting each repetition of a first plurality of repetitions of a first preamble of the random-access procedure. The method can further include transmitting, by the wireless device, a second preamble with a transmit power that is determined based on the power-ramping counter for the random-access procedure.

20 Claims, 21 Drawing Sheets

Related U.S. Application Data

(60) Provisional application No. 63/445,172, filed on Feb. 13, 2023.

(51) Int. Cl.
| | |
|---|---|
| *H04L 5/00* | (2006.01) |
| *H04W 74/0833* | (2024.01) |
| *H04W 74/0808* | (2024.01) |

(56) References Cited

U.S. PATENT DOCUMENTS

| | | | | |
|---|---|---|---|---|
| 2020/0245367 A1* | 7/2020 | Sun | ....................... | H04W 72/23 |
| 2021/0136802 A1 | 5/2021 | Cirik et al. | | |
| 2023/0262754 A1* | 8/2023 | He | ....................... | H04L 5/0091 |
| | | | | 370/329 |
| 2023/0371081 A1 | 11/2023 | Ali et al. | | |
| 2023/0413335 A1 | 12/2023 | Xiong et al. | | |

FOREIGN PATENT DOCUMENTS

| | | | |
|---|---|---|---|
| EP | 3 970 282 B1 | 9/2022 | |
| EP | 3 895 499 B1 | 3/2023 | |

OTHER PUBLICATIONS

3GPP TS 36.321 V17.2.0 (Sep. 2022); Technical Specification; 3rd Generation Partnership Project; Technical Specification Group Radio Access Network; Evolved Universal Terrestrial Radio Access (E-UTRA); Medium Access Control (MAC) protocol specification; (Release 17).

3GPP TS 36.331 V17.2.0 (Sep. 2022); Technical Specification; 3rd Generation Partnership Project; Technical Specification Group Radio Access Network; Evolved Universal Terrestrial Radio Access (E-UTRA); Radio Resource Control (RRC); Protocol specification; (Release 17).

3GPP TS 37.213 V17.4.0 (Dec. 2022); Technical Specification; 3rd Generation Partnership Project; Technical Specification Group Radio Access Network; Physical layer procedures for shared spectrum channel access (Release 17).

3GPP TS 38.133 V17.7.0 (Sep. 2022); Technical Specification; 3rd Generation Partnership Project; Technical Specification Group Radio Access Network; NR; Requirements for support of radio resource management (Release 17).

3GPP Ts 38.213 V17.4.0 (2022-12); Technical Specification; 3rd Generation Partnership Project; Technical Specification Group Radio Access Network; NR; Physical layer procedures for control (Release 17).

3GPP TS 38.321 V17.3.0 (Dec. 2022); Technical Specification; 3rd Generation Partnership Project; Technical Specification Group Radio Access Network; NR; Medium Access Control (MAC) protocol specification; (Release 17).

3GPP TS 38.331 V17.3.0 (Dec. 2022); Technical Specification; 3rd Generation Partnership Project; Technical Specification Group Radio Access Network; NR; Radio Resource Control (RRC) protocol specification; (Release 17).

R1-220xxxx; 3GPP TSG RAN WG1 Meeting #110-e; Toulouse, Aug. 22-26, 2022; Source: MCC Support; Title: Draft Report of 3GPP TSG RAN WG1 #109-e v0.3.01 (Online meeting, May 9-20, 2022); Document for: Comments.

R1-2208321; 3GPP TSG RAN WG1 Meeting #110bis-e; Online, Oct. 10-19, 2022; Source: MCC Support; Title: Final Report of 3GPP TSG RAN WG1 #110 v1.0.0; (Toulouse, France, Aug. 22-26, 2022); Document for: Approval.

R1-2210801; 3GPP TSG RAN WG1 Meeting #111; Toulouse, France, Nov. 14-18, 2022; Source: MCC Support; Title: Final Report of 3GPP TSG RAN WG1 #110bis-e v1.0.0; (Online, Oct. 10-19, 2022); Document for: Approval.

R1-2007682; 3GPP TSG RAN WG1 #103-e; e-Meeting, Oct. 26-Nov. 13, 2020; Source: vivo; Title: Discussion on coverage enhancements for channels other than PUCCH and PUSCH; Agenda Item: 8.8.2.3; Document for: Discussion and Decision.

R1-2208411; 3GPP TSG-RAN WG1 Meeting #110bis-e; e-Meeting, Oct. 10-19, 2022; Agenda Item: 9.14.1; Source: Huawei, HiSilicon; Title: Discussion on PRACH coverage enhancements; Document for: Discussion and Decision.

R1-2208846; 3GPP TSG RAN WG1 #110bis-e; e-Meeting, Oct. 10-19, 2022; Source: OPPO; Title: PRACH coverage enhancements; Agenda Item: 9.14.1; Document for: Discussion.

R1-2209363; 3GPP TSG RAN WG1 #110bis-e; e-Meeting, Oct. 10-Oct. 19, 2022; Agenda item: 9.14.1; Source: CMCC; Title: Discussion on PRACH coverage enhancements; Document for: Discussion and Decision.

R1-2210600; 3GPP TSG RAN WG1 #110bis-e; e-Meeting, Oct. 10-19, 2022; Agenda item: 9.3.1; Source: Moderator (CMCC); Title: Summary#5 on evaluation on NR duplex evolution; Document for: Discussion/decision.

R1-2210879; 3GPP TSG-RAN WG1 Meeting #111; Toulouse, France, Nov. 14-18, 2022; Agenda Item: 9.14.1; Source: Huawei, HiSilicon; Title: Discussion on PRACH coverage enhancements; Document for: Discussion and Decision.

R1-2211047; 3GPP TSG RAN WG1 #111; Toulouse, France, Nov. 14-18, 2022; Source: ZTE; Title: Discussion on PRACH coverage enhancements; Agenda item: 9.14.1; Document for: Discussion and Decision.

R1-2211185; 3GPP TSG RAN WG1 #111; Toulouse, France, Nov. 14-18, 2022; Source: CATT; Title: PRACH coverage enhancements; Agenda Item: 9.14.1; Document for: Discussion and Decision.

R1-2211423; 3GPP TSG RAN WG1 #111; Toulouse, France, Nov. 14-18, 2022; Source: Intel Corporation; Title: Discussions on PRACH coverage enhancement; Agenda item: 9.14.1; Document for: Discussion and Decision.

R1-2211595; 3GPP TSG RAN WG1 #111; Toulouse, Nov. 14-18, 2022; Agenda item: 9.14.1; Source: Nokia, Nokia Shanghai Bell; Title: PRACH coverage enhancements; Document for: Discussion and Decision.

R1-2212073; 3GPP Tsg Ran WG1 #111; Toulouse, France, Nov. 14-18, 2022; Agenda Item: 9.14.1; Source: Samsung; Title: PRACH coverage enhancements; Document for: Discussion.

R1-2212568; 3GPP TSG RAN WG1 #111; Toulouse, France, Nov. 14-18, 2022; Agenda Item: 9.14.1; Source: Moderator (China Telecom); Title: FL Summary#3 on PRACH coverage enhancements; Document for: Discussion.

R2-161734; 3GPP TSG-RAN WG2 #93; St. Julian's, Malta, Feb. 15-19, 2016; Agenda Item: 7.4.6; Source: Ericsson [rapporteur]; Title: Email discussion report on [92#44][LTE/MTC] MAC Open Items; Document for: Discussion, Decision.

R2-161771; 3GPP TSG-RAN WG2 Meeting #93; St. Julian's, Malta, Feb. 15-19, 2016; Agenda Item: 13.1.1; Source: Session Chairman (LG Electronics); Title: Report of the LTE UP session; Document for: Approval.

R2-2004301; 3GPP TSG-RAN WG2 meeting #110-e; Agenda Item: 2.2; Source: ETSI MCC; Title: Report of 3GPP Tsg RAN2#109bis-e meeting, Online; Document for: Approval; Report of 3GPP Tsg Ran WG2 meeting #109bis-e; Online; Apr. 20-30, 2020.

R2-2210600; 3GPP TSG-RAN WG2 Meeting #119bis electronic; Online, Oct. 10-19, 2022; Agenda Item: 8.5.4 (FS_NR_XR_enh); Source: LG Electronics Inc.; Title: Discussion on Scheduling enahancement for XR; Document for: Discussion and Decision.

R2-2212073; 3GPP TSG RAN WG2 #120; Toulouse, France, Nov. 14-18, 2022; Agenda Item: 6.11.2; Source: Xiaomi; Title: Discussion on the preconfigured MG activation and deactivation request; Document for: Discussion and Decision.

RP-221858; 3GPP TSG RAN Meeting #96; Budapest, Hungary, Jun. 6-9, 2022 (revision of RP-220937); Source: China Telecom; Title: Revised WID on Further NR coverage enhancements; Document for: Approval.

R1- 2211183; 3GPP TSG RAN WG1 #111; Toulouse, France, Nov. 14-18, 2022; Source: CATT; Title: Low-Power WUS receiver Architectures and its performance; Agenda Item: 9.13.2; Document for: Discussion and Decision.

(56)          References Cited

OTHER PUBLICATIONS

R1-2211630; 3GPP TSG RAN WG1 #111; Toulouse, France, Nov. 14-18, 2022; Agenda Item: 9.14.1; Source: Sony; Title: PRACH Coverage Enhancement using Multi PRACH Transmissions; Document for: Discussion / decision.

International Search Report and Written Opinion of the International Searching Authority mailed Jul. 30, 2024, in International Application No. PCT/US2024/014737.

R1-1913414; 3GPP Tsg RAN WG 1 #99; Reno, USA, Nov. 18-22, 2019; Agenda Item: 7.2.1.2; Source: ZTE; Title: FL Summary #2 of Procedure for 2-step RACH; Document for: Discussion and decision.

R1-2000151; 3GPP TSG RAN WG1 Meeting #100-e; e-Meeting, Feb. 24-Mar. 6, 2020; Source: MCC Support; Title: Final Report of 3GPP TSG RAN WGI #99 v1.0.0 (Reno, USA, Nov. 18- 22, 2019); Document for: Approval.

* cited by examiner

100

150

Figure 3:
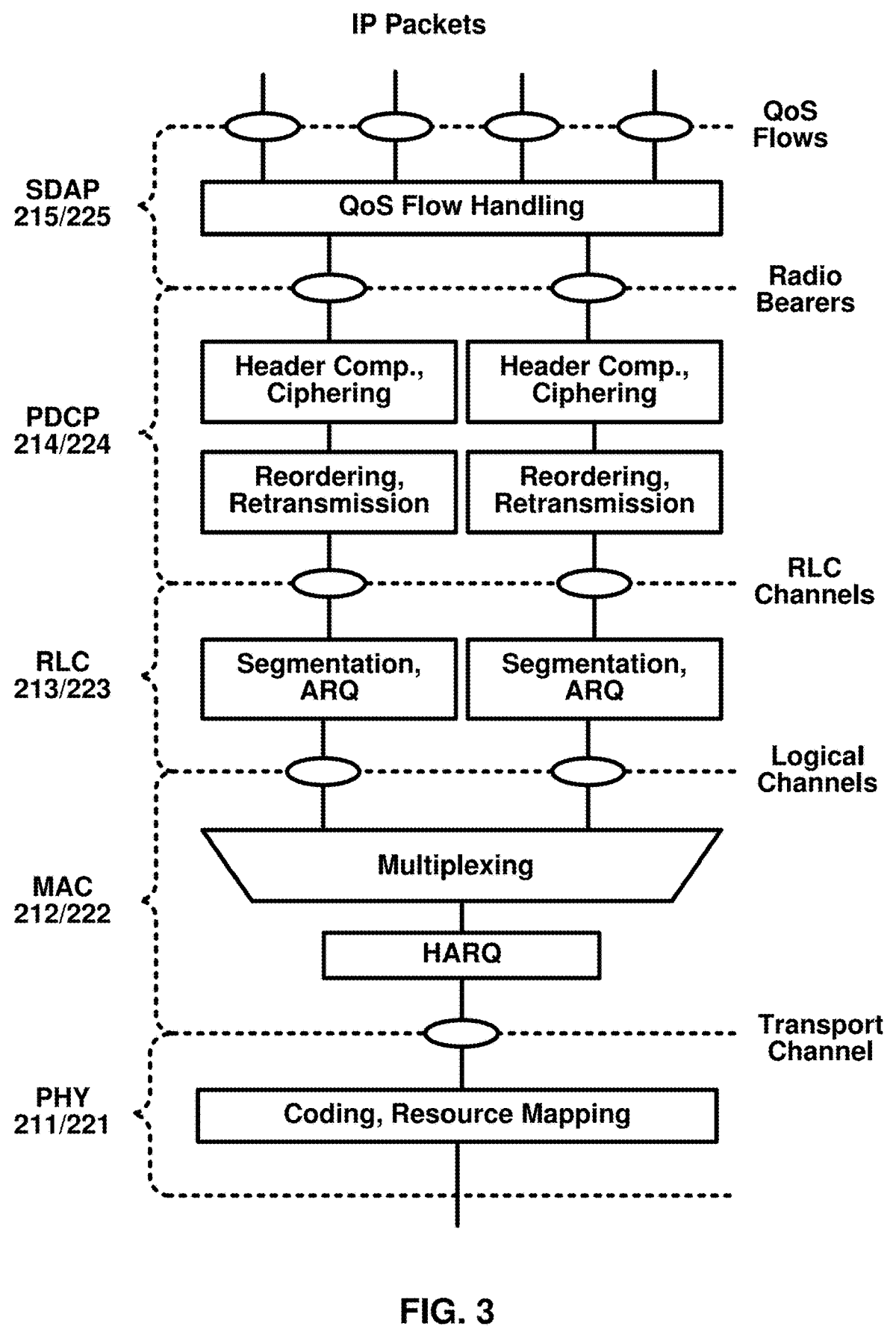

IP Packets

QoS Flows

SDAP 215/225

QoS Flow Handling

Radio Bearers

PDCP 214/224

Header Comp., Ciphering | Header Comp., Ciphering

Reordering, Retransmission | Reordering, Retransmission

RLC Channels

RLC 213/223

Segmentation, ARQ | Segmentation, ARQ

Logical Channels

MAC 212/222

Multiplexing

HARQ

Transport Channel

PHY 211/221

Coding, Resource Mapping

Uplink

FIG. 5A

Downlink

Logical Channels

Transport Channels

Physical Channels

Physical Signals

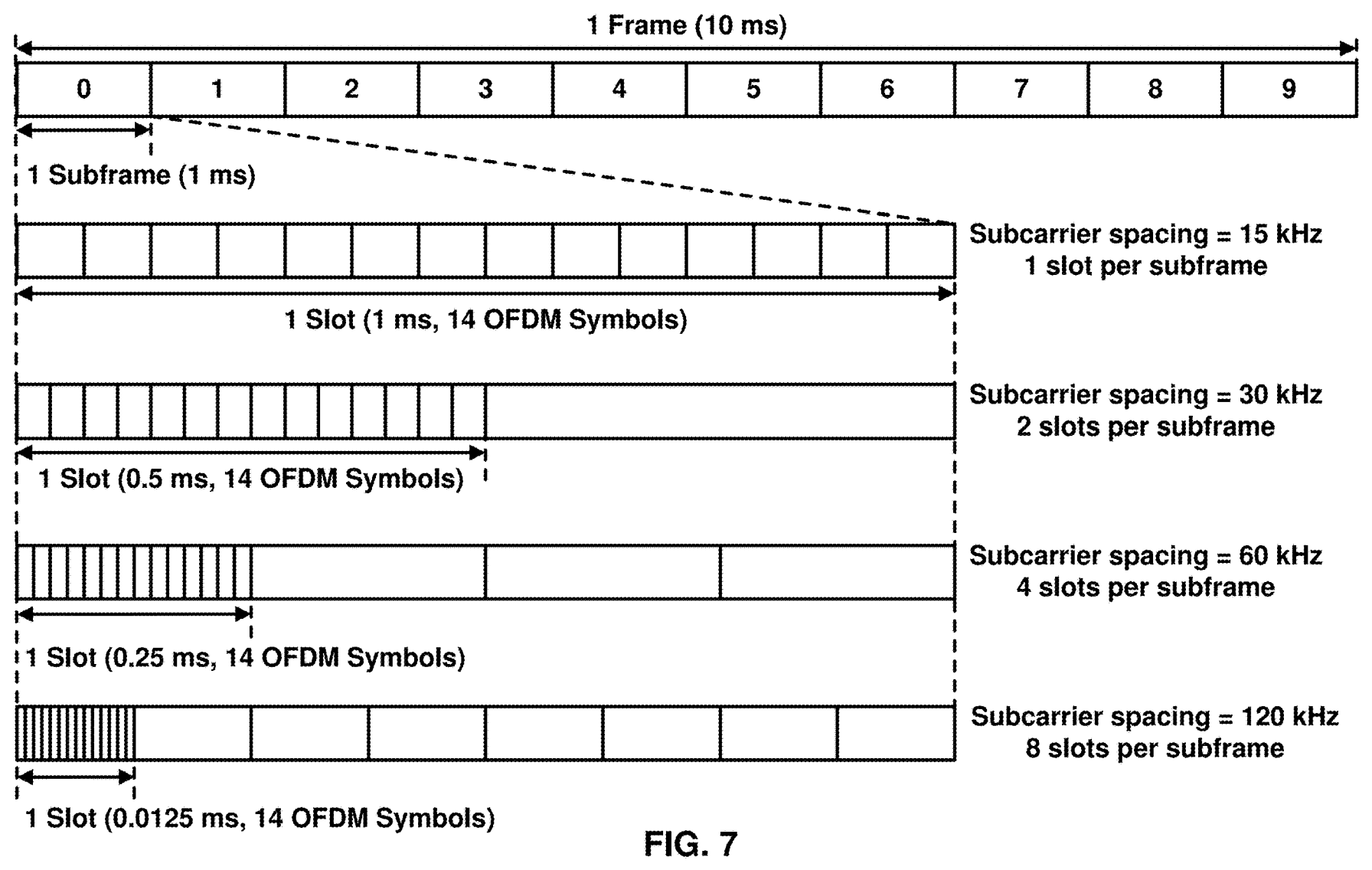

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

LISTEN BEFORE TALK WITH PREAMBLE REPETITIONS

CROSS REFERENCE TO RELATED APPLICATIONS

This application is a continuation of International Application No. PCT/US2024/014737, filed Feb. 7, 2024, which claims the benefit of U.S. Provisional Application No. 63/445,172, filed Feb. 13, 2023, all of which are hereby incorporated by reference in their entireties.

BRIEF DESCRIPTION OF THE DRAWINGS

Examples of several of the various embodiments of the present disclosure are described herein with reference to the drawings.

FIG. 3 illustrates an example of services provided between protocol layers of the NR user plane protocol stack of FIG. 2A.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

DETAILED DESCRIPTION

Figures 1A, 1B:
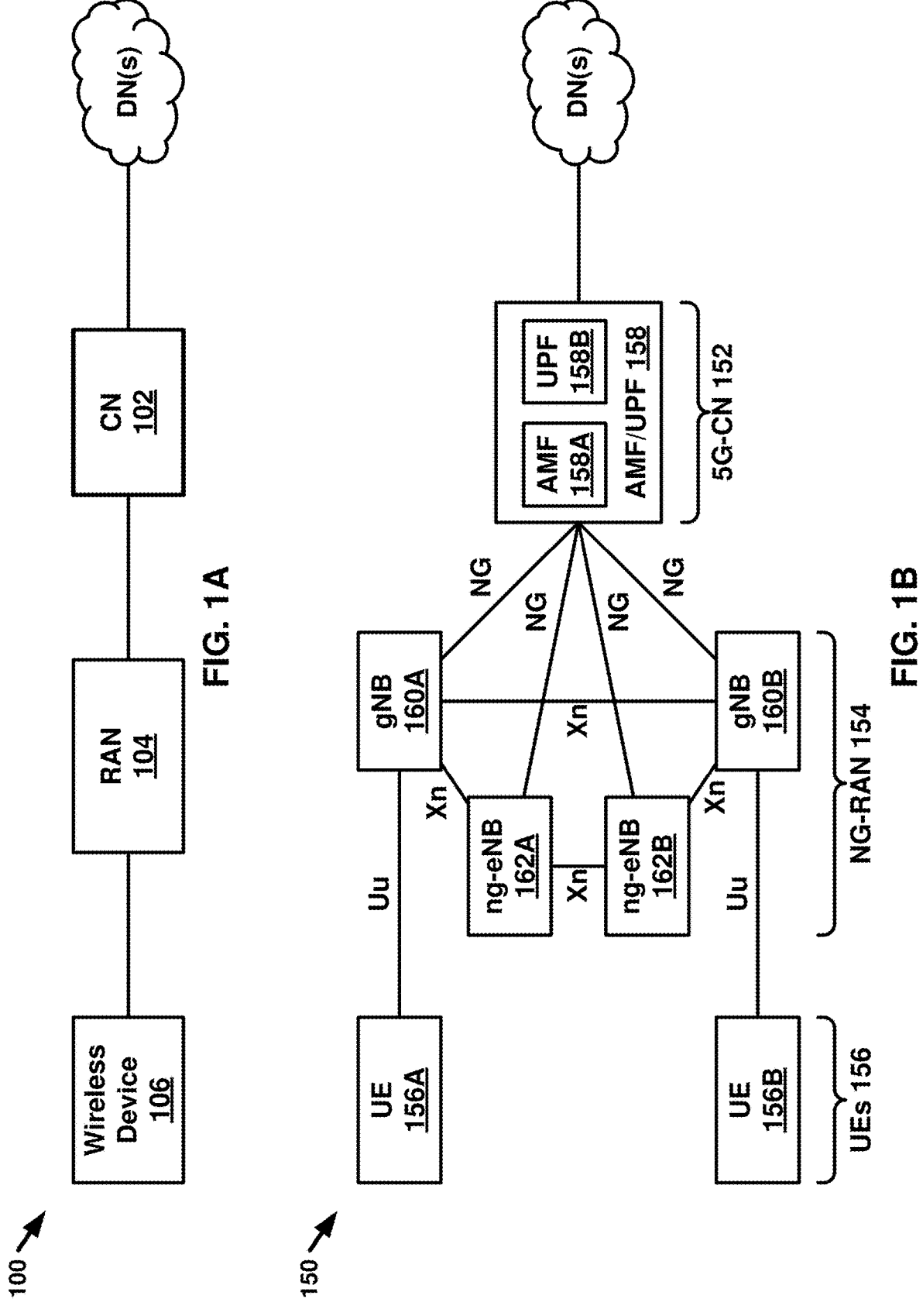
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
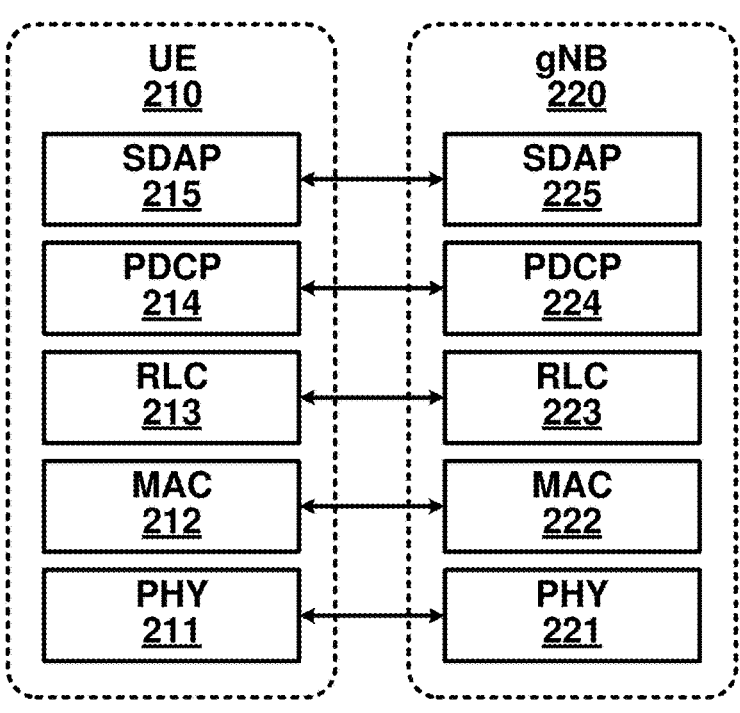
FIG. 2A and FIG. 2B respectively illustrate a New Radio (NR) user plane and control plane protocol stack.
Figure 2B:
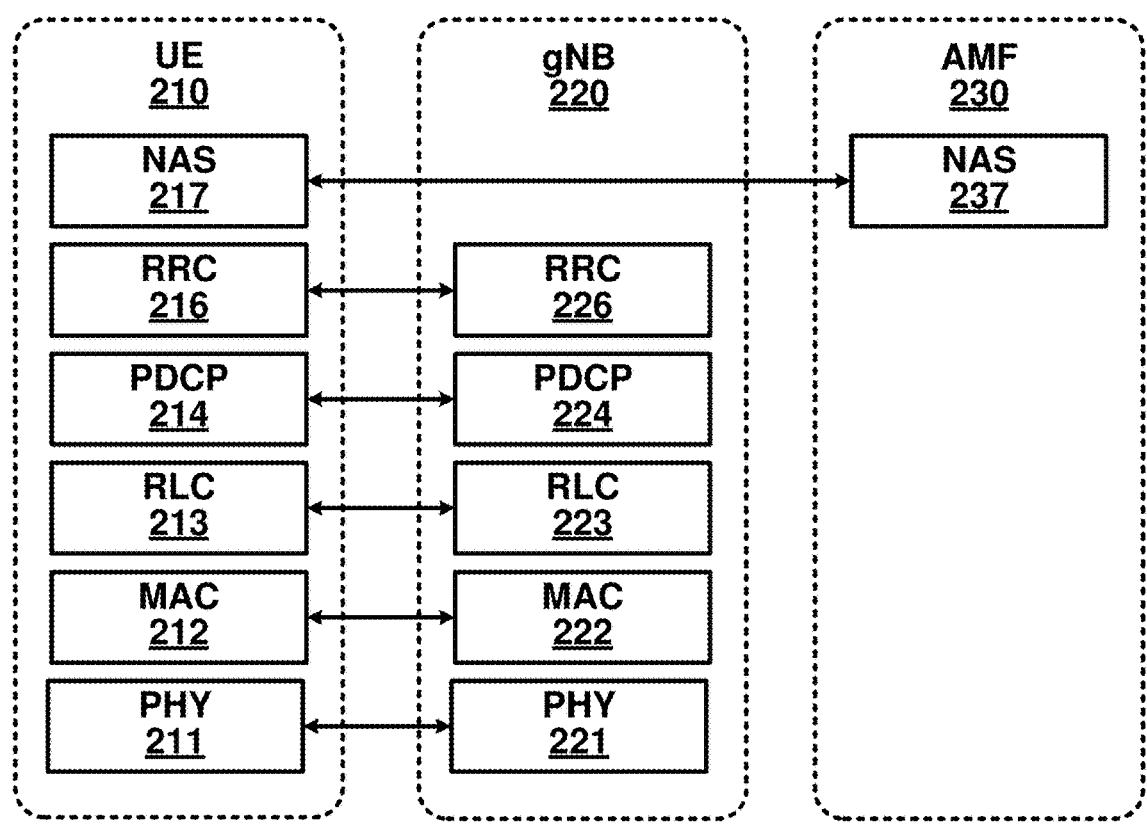

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
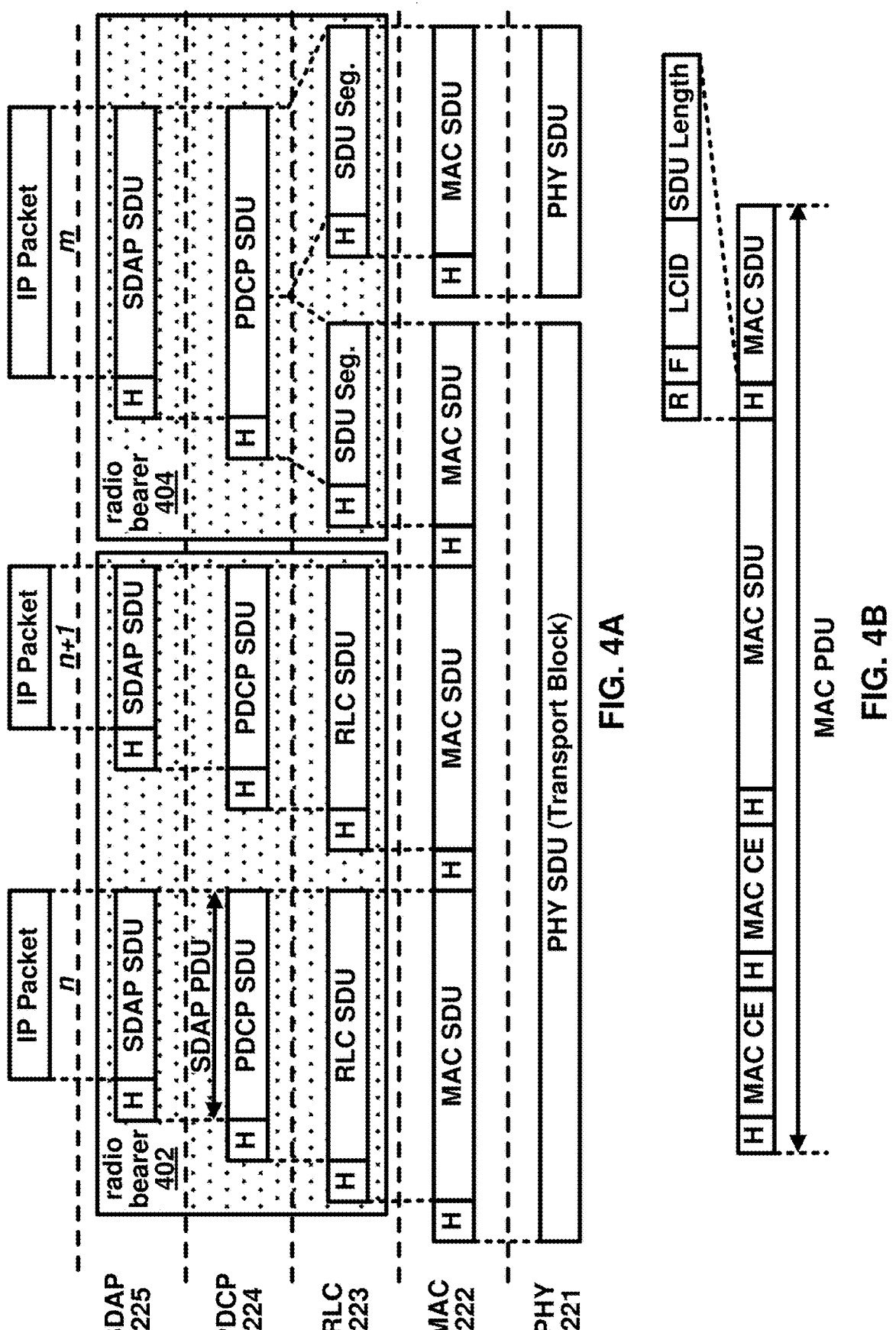
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
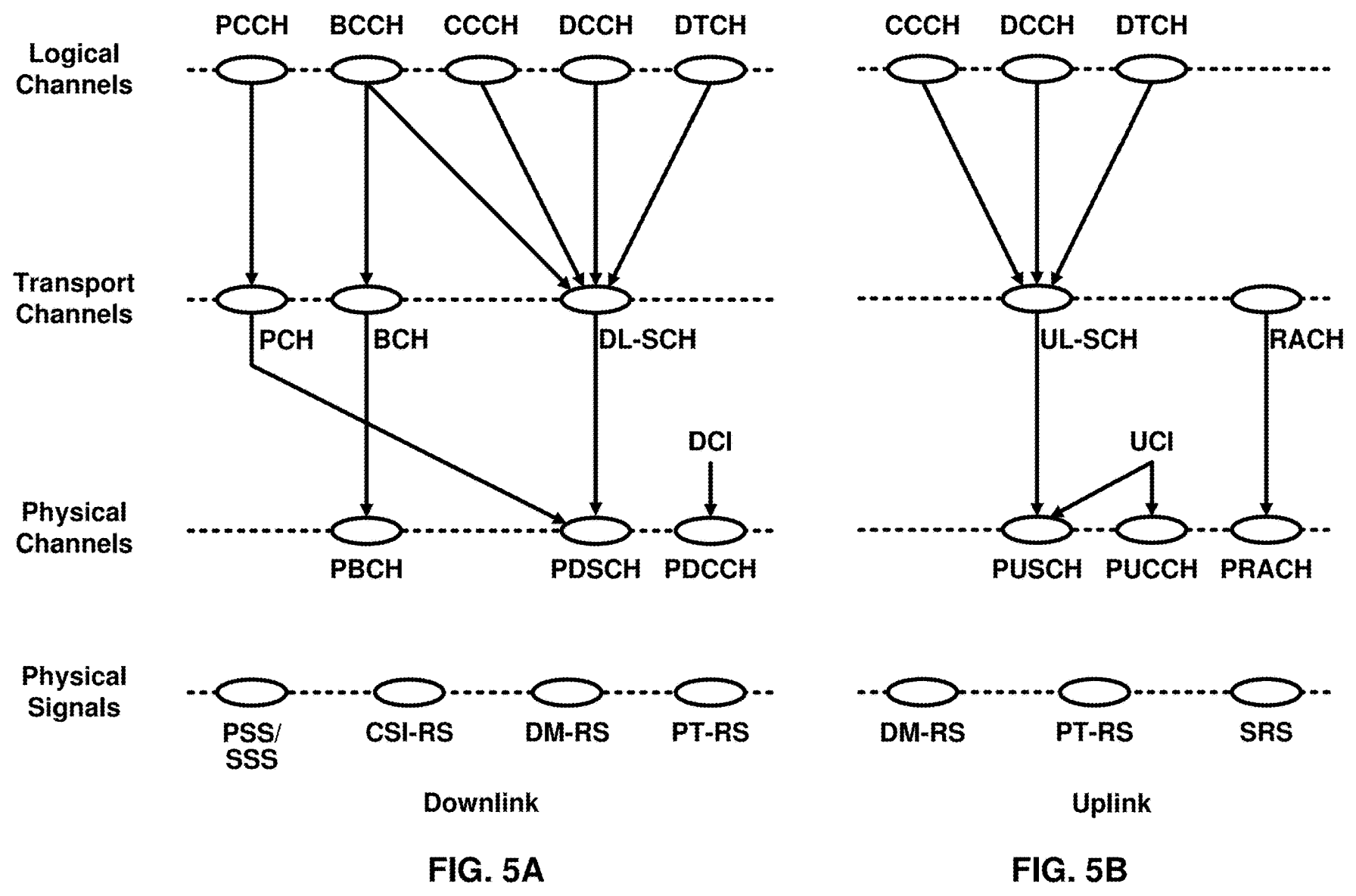

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;

- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
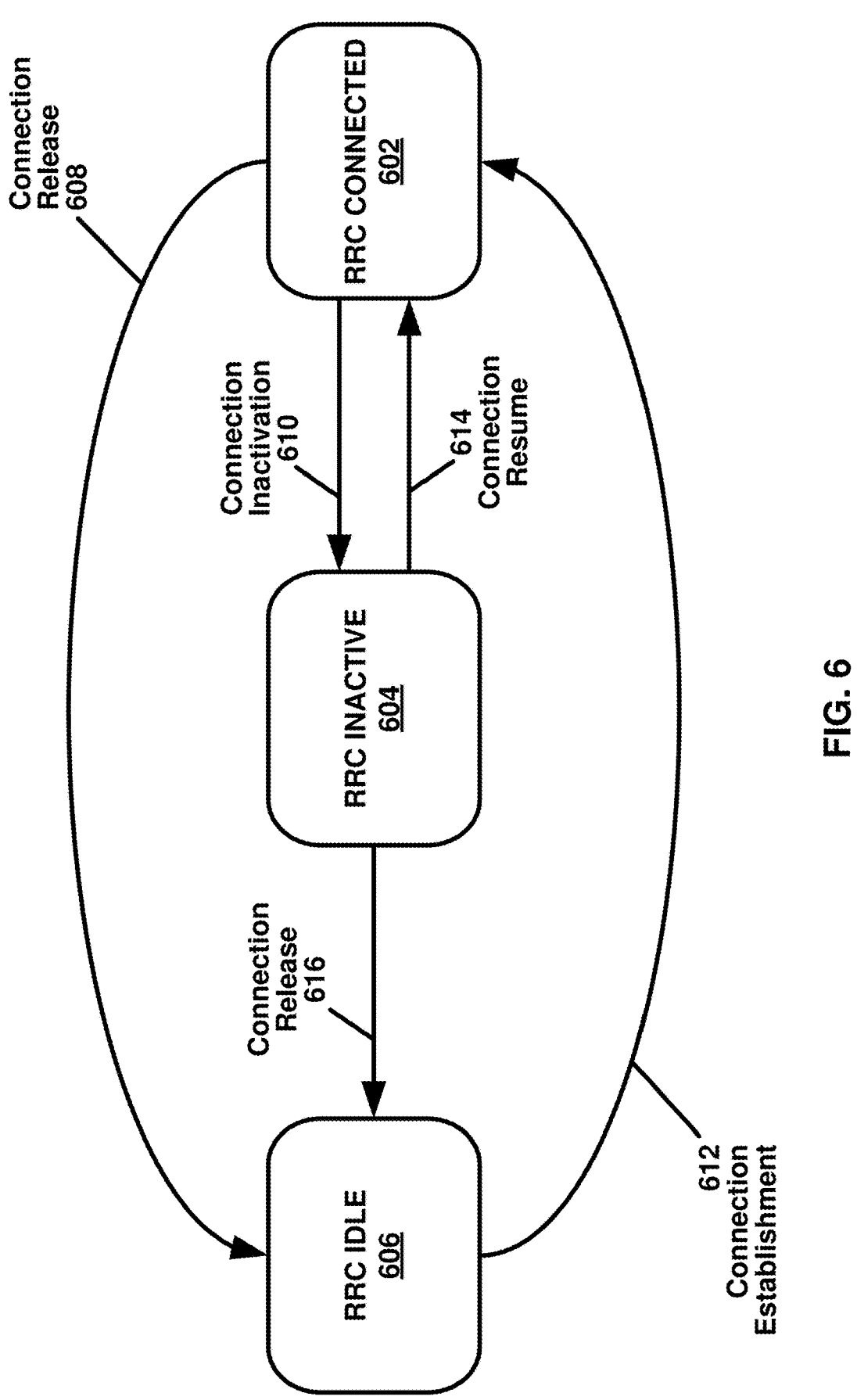
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHZ up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/ cyclic prefix duration combinations: 15 kHz/4.7 μs; 30 KHz/2.3 μs; 60 KHz/1.2 μs; 120 KHz/0.59 μs; and 240 KHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
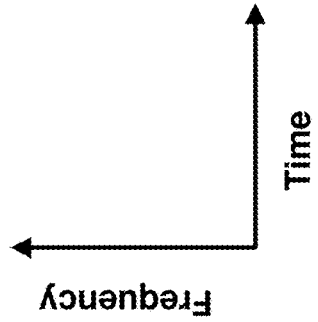
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHZ bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
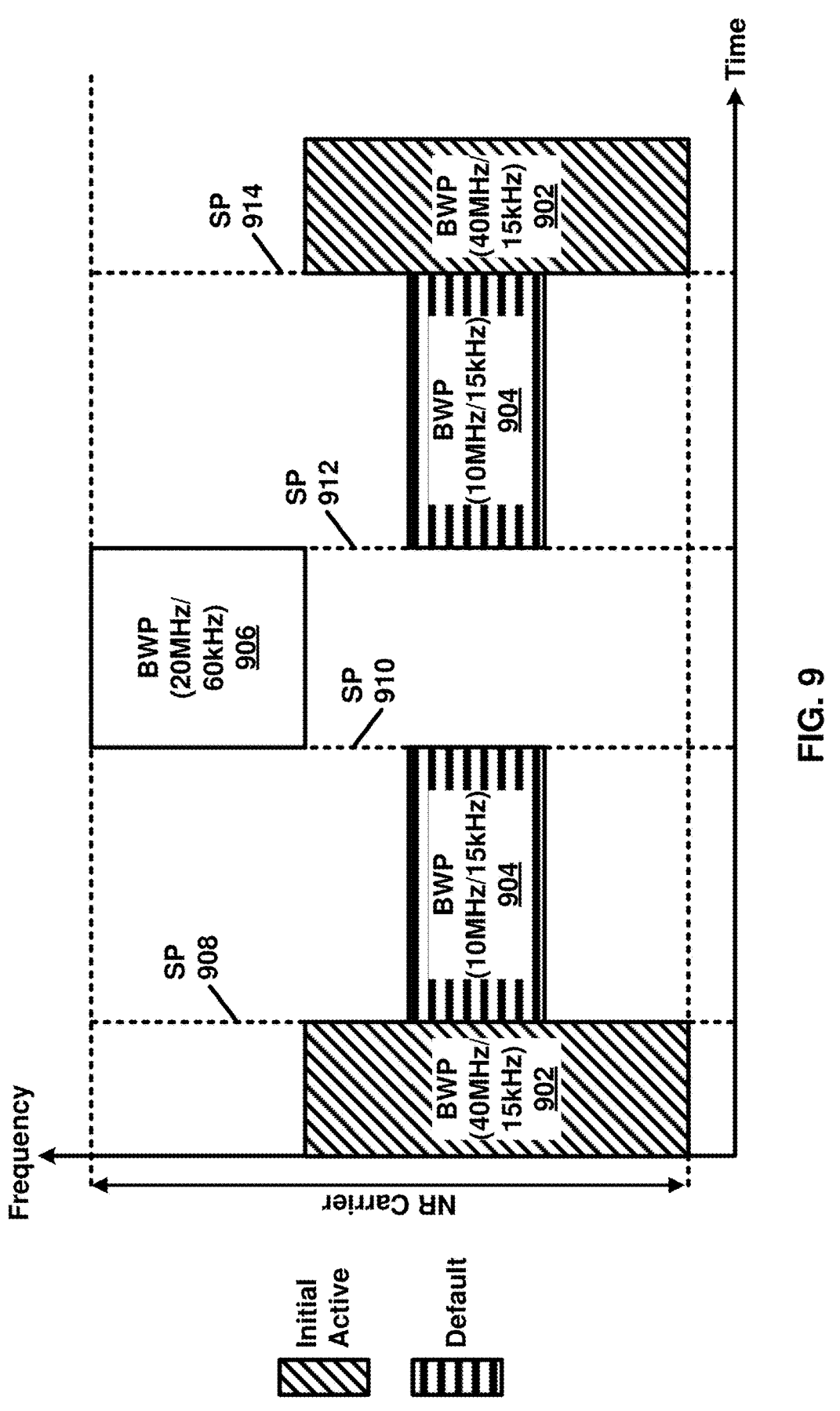
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
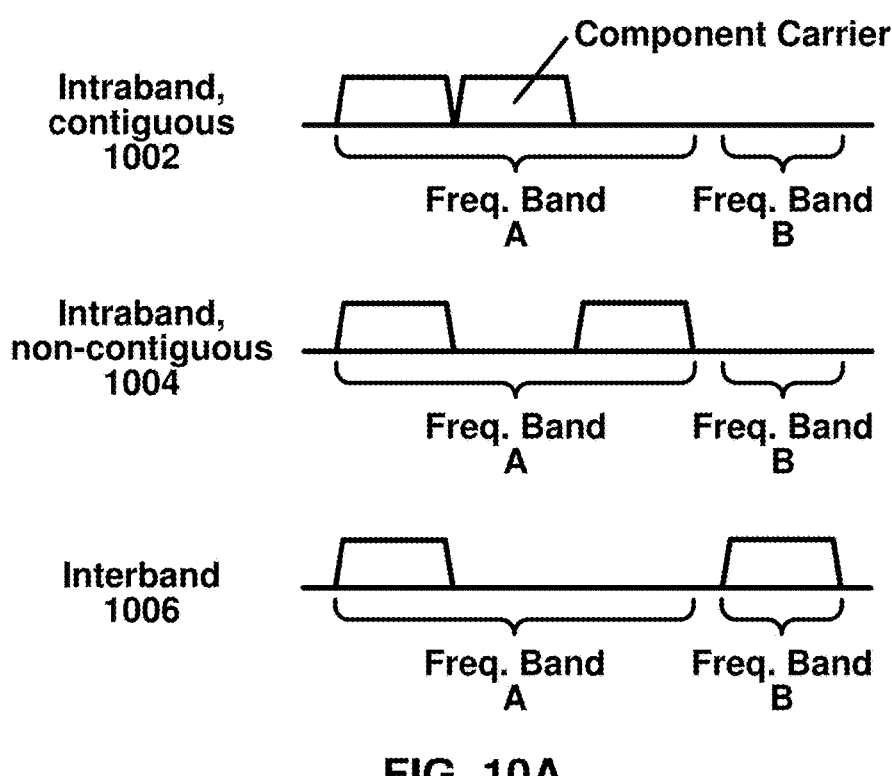
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
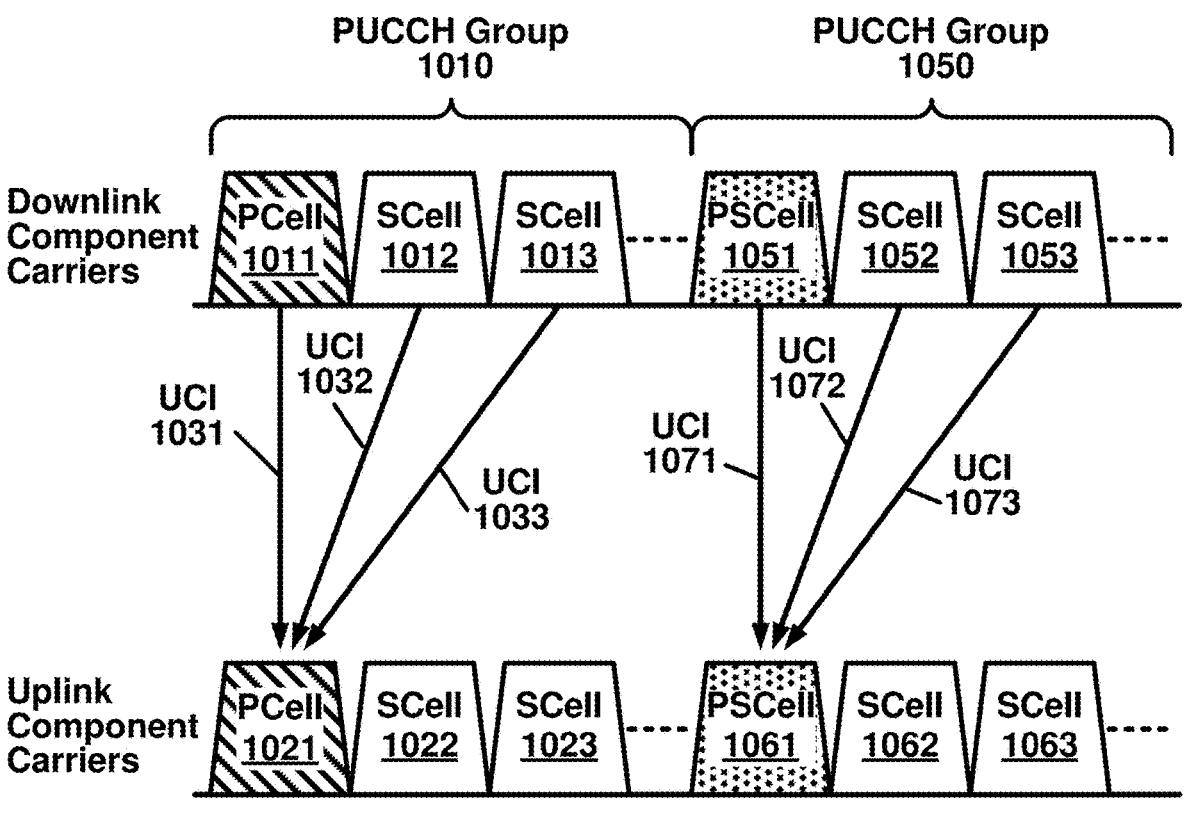
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
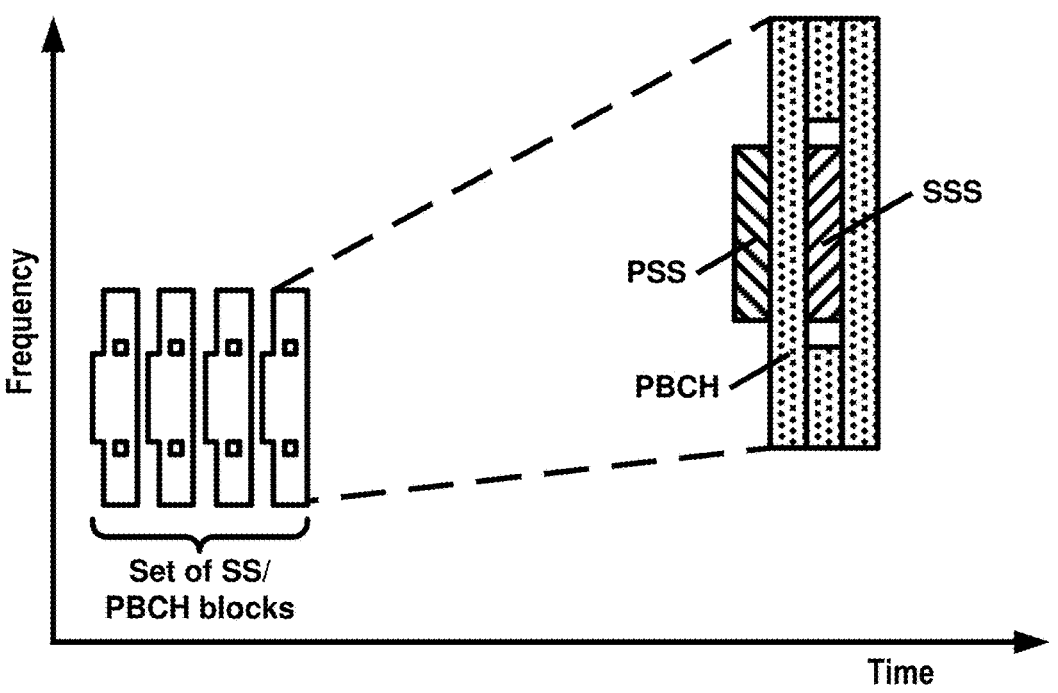
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for down-link CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
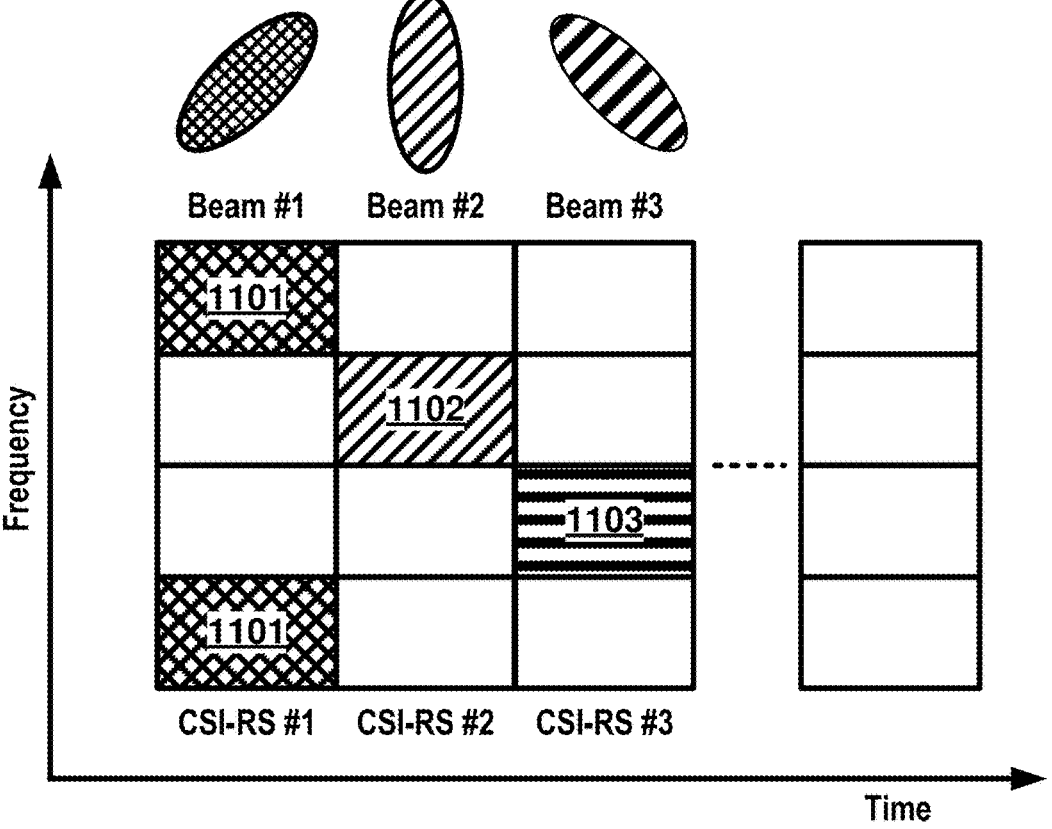
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
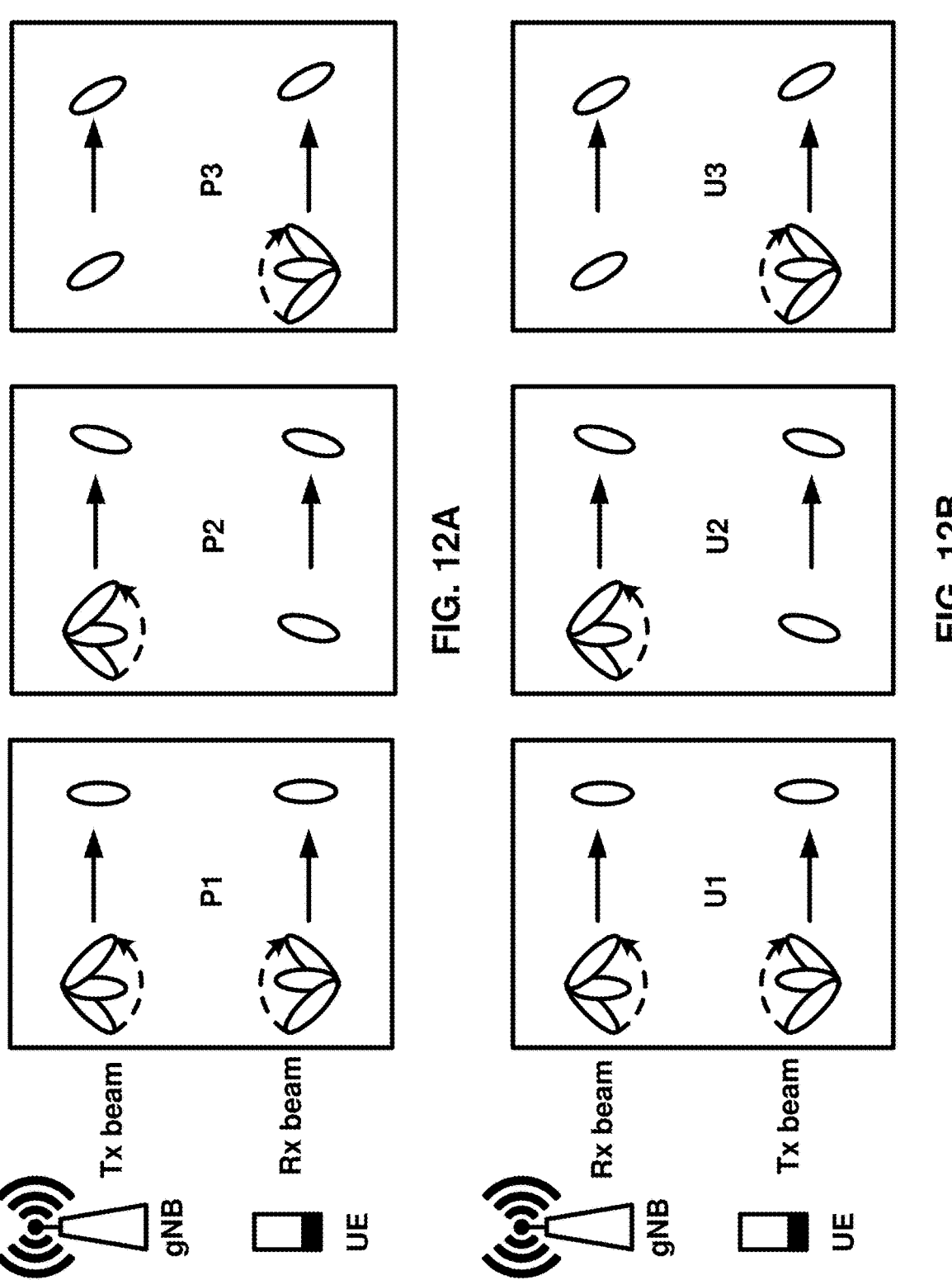
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counterclockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement. The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
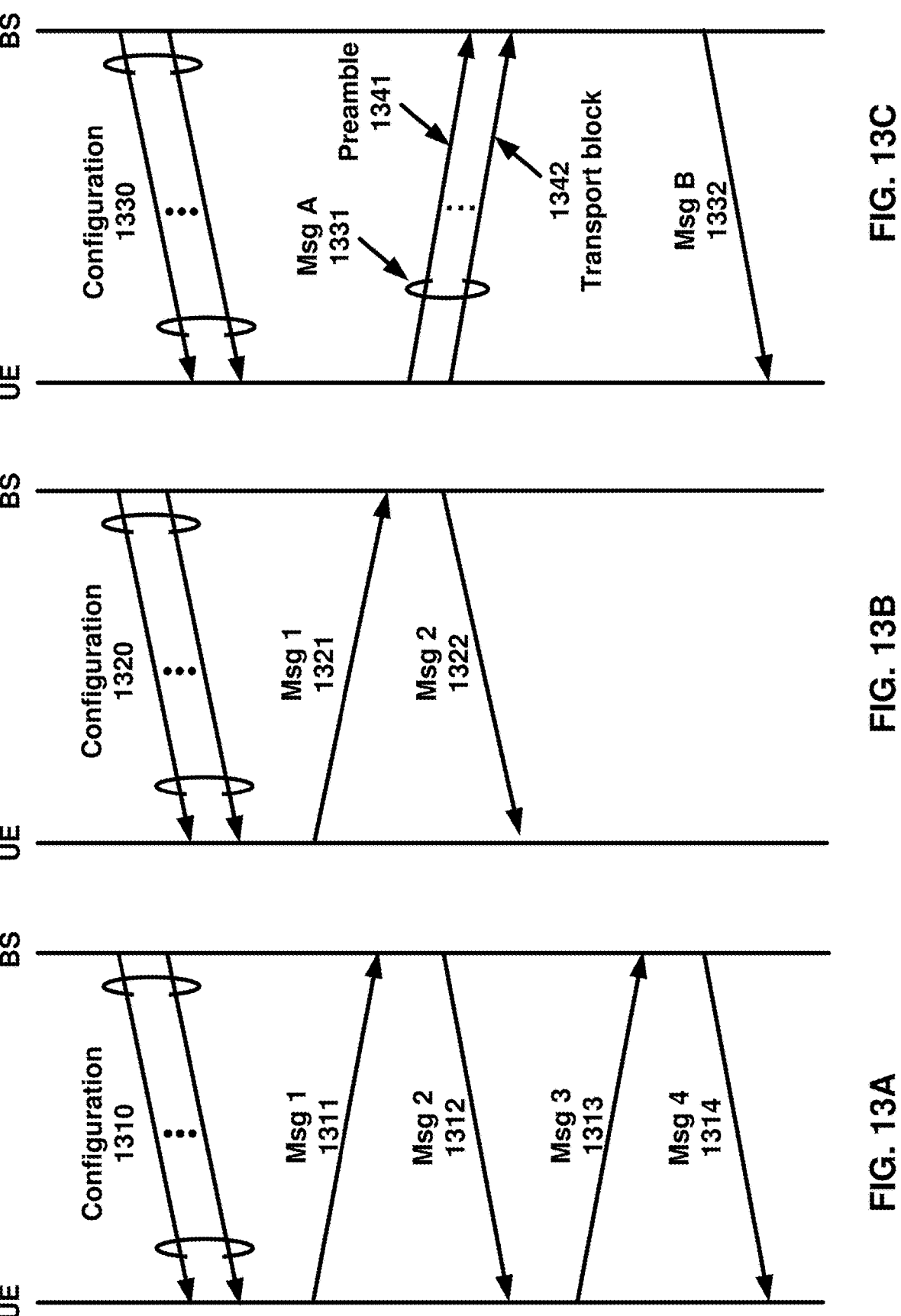
FIG. 13A, FIG. 13B, and FIG. 13C respectively illustrate a four-step contention-based random-access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preamble TransMax).

The Msg 2 1312 received by the UE may include/comprise an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a pay load transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
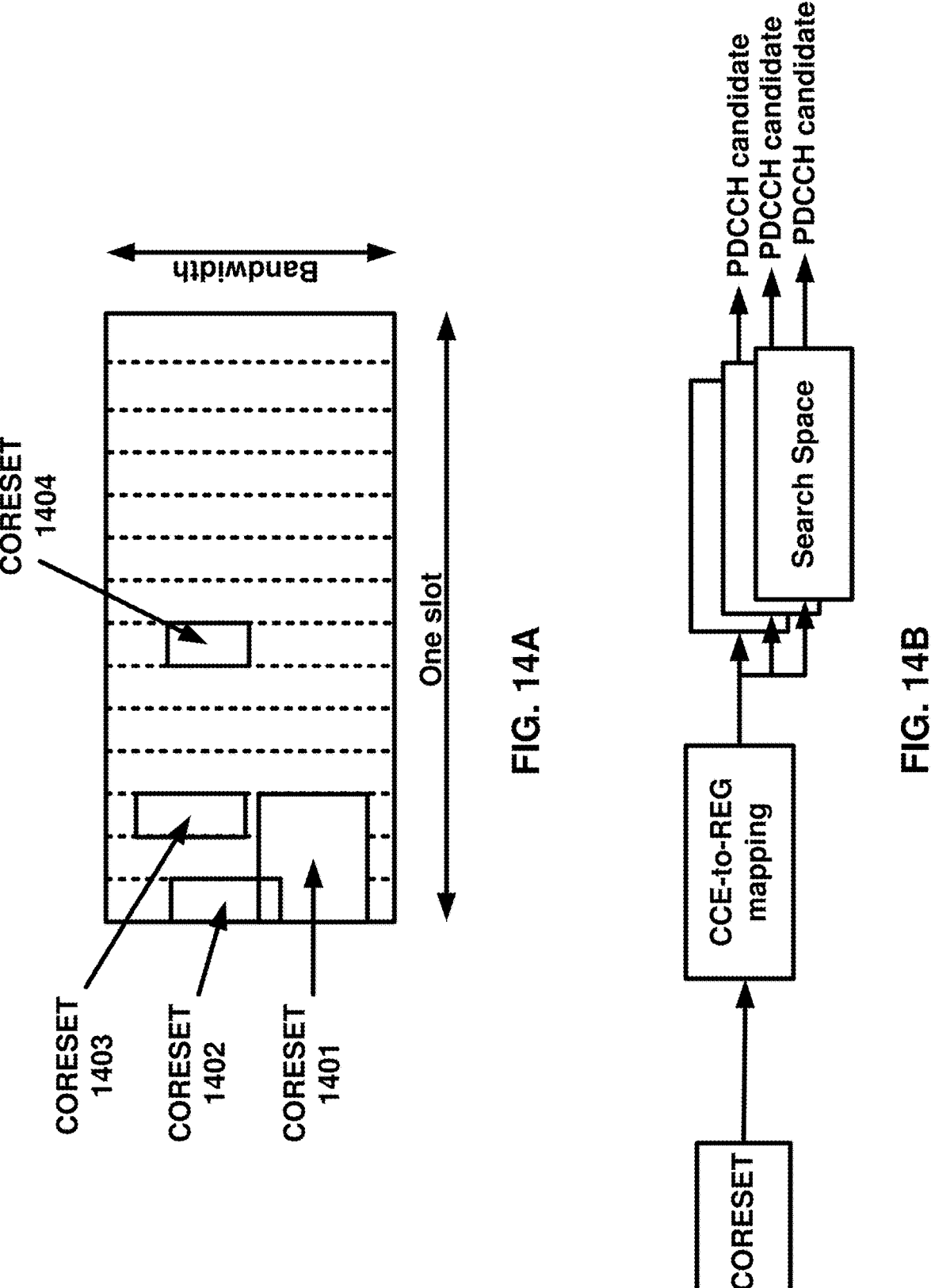
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
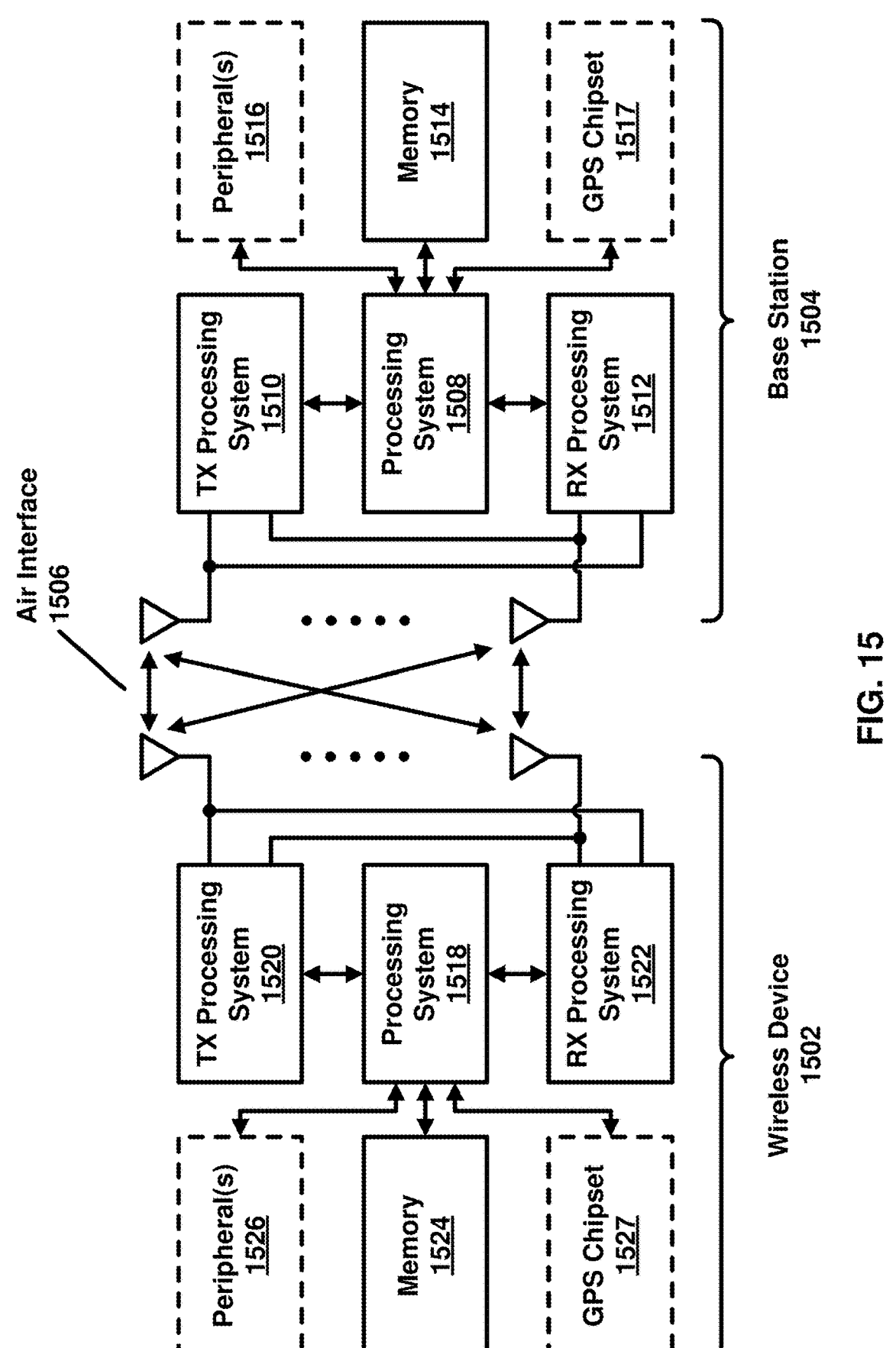
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
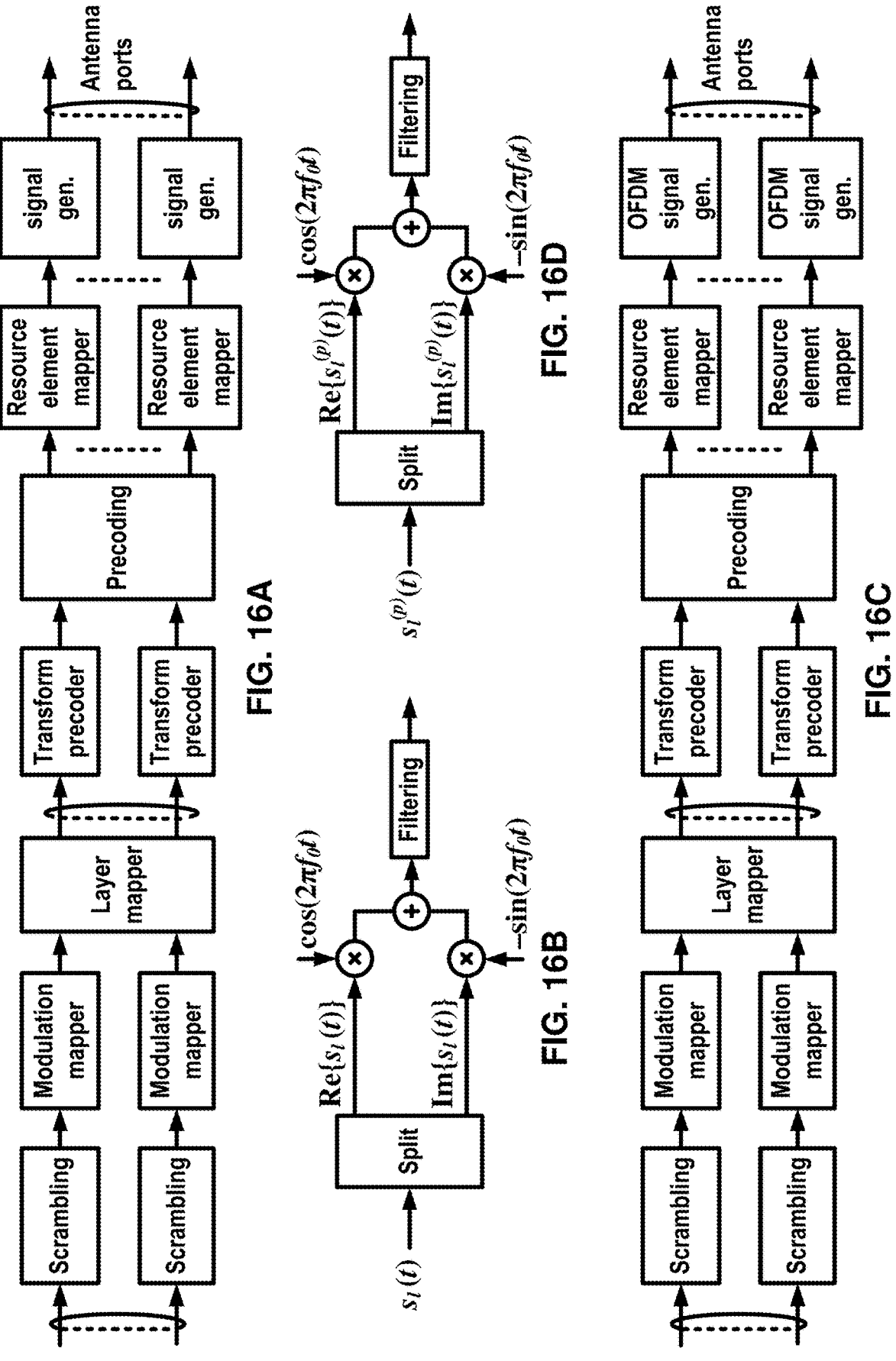
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like.

These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual connectivity) via the plurality of cells. The one or more messages (e.g. as a part of the configuration parameters) may comprise parameters of physical, MAC, RLC, PCDP, SDAP, and RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

To improve NR uplink coverage for both FR1 and FR2, enhancements on PUSCH, PUCCH and MSG3 PUSCH may be supported.

Enhanced aggregation of multiple slots with TB repetition may be supported for both PUSCH transmission with dynamic and configured grant. In addition, counting based on available slots may be supported. A maximum number of aggregated slots for counting based on available slots and counting based on physical slots may be both 32.

TB processing over multiple slots with and without repetition may be supported for both PUSCH transmission with dynamic grant and configured grant. For a single transmission of TB processing over multiple slots PUSCH, a TB size may be determined based on multiple slots.

DMRS bundling where a wireless device maintains phase continuity and power consistency across PUSCH transmissions or PUCCH repetitions to enable improved channel estimation may be supported. Inter-slot frequency hopping with DMRS bundling may be supported.

Dynamic PUCCH repetition factor indication configured per PUCCH resource may be introduced, applicable to all PUCCH formats.

Aggregation of multiple slots with TB repetition for MSG3 transmission may be supported on both NUL and SUL, applicable to CBRA with 4-step RA type. If configured, the wireless device may request MSG3 repetition via separate RACH resources when the RSRP of DL path-loss reference is lower than a configured threshold. BWP configured with RACH resources solely for MSG3 repetition may be supported without a need to consider the RSRP of DL path-loss reference by the wireless device.

A random access procedure may be initiated by a PDCCH order, by a MAC entity (e.g., MAC entity of a wireless device, a wireless device, and the like) itself, or by RRC (e.g., RRC layer of the wireless device, upper layer(s), upper layer(s) of the wireless device, and the like). There may be one random access procedure ongoing at any point in time in a MAC entity. The random access procedure on an SCell may be initiated by a PDCCH order with ra-PreambleIndex different from 0b000000.

A wireless device may transmit a preamble (e.g., random access preamble, Msg1, random access message 1, RACH transmission, RACH, PRACH, PRACH transmission, random access message, and the like), for the random access procedure, with a number of repetitions (e.g., 1, 2, 4, 8, and the like). Transmitting the preamble with the number of repetitions may, for example, be the same as transmitting the number of repetitions of the preamble. Transmitting the number of repetitions of the preamble by the wireless device may comprise, for example, a medium access control (MAC) layer (e.g., upper layer) of the wireless device instructing a physical layer (e.g., lower layer) of the wireless device to transmit the number of repetitions of the preamble.

In an example, the number may be greater (e.g., more, larger, higher, and the like) than one. The wireless device may transmit the preamble with the number of repetitions, for example, to increase coverage (e.g., for coverage enhancement (CE), to increase coverage range, and the like). The wireless device may determine one or more resources (e.g., PRACH resources, RACH resources, random access resources, MsgA resources, PUSCH resources, uplink resources, and the like) to transmit the preamble, for example, based on a reference signal (e.g., pathloss reference signal, synchronization signal block (SSB), physical broadcast channel (PBCH), synchronization signal (SS)/physical broadcast channel (PBCH) block, channel state information reference signal (CSI-RS), cell-specific reference signal (CRS), and the like).

NR Radio Access operating with shared spectrum channel access may operate in different modes where PCell, PSCell, and/or SCells can be in shared spectrum and an SCell may (or may not) be configured with uplink.

A base station (BS) and a wireless device may apply Listen-Before-Talk (LBT) before performing a transmission on a cell configured with shared spectrum channel access. When LBT is applied, a transmitter (e.g., the wireless device, the base station, and the like) may listen to (e.g., sense) the channel to determine whether the channel is free or busy. The transmitter may perform transmission (e.g., only) if the channel is sensed free.

Sensing a channel may be per Bandwidth Part (BWP) and based on all uplink transmissions within the BWP. When consistent uplink LBT failures are detected on SCell(s), the wireless device may report the consistent uplink LBT failures to the base station (e.g., MN for MCG, SN for SCG, and the like) via a MAC CE on a different serving cell than the SCell(s) where the failures were detected. If no resources are available to transmit the MAC CE, a Scheduling Request (SR) may be transmitted by the wireless device. When consistent uplink LBT failures are detected on SpCell, the wireless device may switch to another UL BWP with configured RACH resources on that cell. The wireless device may initiate RACH. The wireless device may report the consistent uplink LBT failures via the MAC CE. When multiple UL BWPs are available for switching, it may be up to the wireless device implementation which one to select. For PSCell, if consistent uplink LBT failures are detected on all the UL BWPs with configured RACH resources, the wireless device may declare SCG RLF. The wireless device may report the failure to the MN via SCGFailureInformation. For PCell, if the uplink LBT failures are detected on all the UL BWP(s) with configured RACH resources, the wireless device may declare RLF.

For a random access (RA) preamble in FR1, sequence lengths of 571 and 1151 may be used by the wireless device for operation with shared spectrum channel access (e.g., unlicensed band). For FR2-2, sequence lengths of 571 and 1151 may be used by the wireless device for operation with either licensed or shared spectrum channel access (e.g., unlicensed band).

URLLC services may be supported in shared spectrum where LBT failures are assumed to be not frequent. In this case, a channel access procedure for semi-static channel occupancy may be initiated by the base station or the wireless device, or the base station operates in dynamic channel access mode. To handle potential LBT failures on configured grants (CG), a CG retransmission timer may be configured to enable autonomous retransmissions. The CG retransmission timer may be configured simultaneously with enhanced intra-wireless device overlapping resource prioritization mechanisms. When the CG retransmission timer is configured, the wireless device may select HARQ process for each CG resource. If the enhanced intra-wireless device overlapping resource prioritization mechanisms is configured, the wireless device may be further configured to select a HARQ process for a CG resource based on logical channel priority.

NR radio access operating with shared spectrum channel access can support the following deployment scenarios: Carrier aggregation between NR in licensed spectrum (SpCell) and NR in shared spectrum (SCell), wherein SCell is not configured with uplink (DL only) or SCell is configured with uplink (DL+UL); Dual connectivity between LTE in licensed spectrum and NR in shared spectrum (PSCell); NR in shared spectrum (PCell); NR cell in shared spectrum and uplink in licensed spectrum; and/or Dual connectivity between NR in licensed spectrum (PCell) and NR in shared spectrum (PSCell). Carrier aggregation of cells in shared spectrum may be applicable to any/all above deployment scenarios.

A wireless device performing transmission(s) on LAA Scell(s), a base station scheduling or configuring UL transmission(s) for a wireless device performing transmission(s) on LAA Scell(s), and a wireless device performing transmission(s) on channel(s) and a gNB scheduling or configuring UL transmission(s) for a wireless device performing transmissions on channel(s) may perform procedures described in the following for the wireless device to access the channel(s) on which the transmission(s) are performed.

Transmissions from a wireless device may be considered as separate UL transmissions, irrespective of having a gap between transmissions or not, and Xthresh for sensing may be adjusted.

A wireless device may perform channel access procedures unless a higher layer parameter ChannelAccessMode-r16 is provided and ChannelAccessMode-r16='semiStatic'.

If a wireless device fails to access the channel(s) prior to an intended UL transmission to a gNB/base station, Layer 1 of the wireless device may notify higher layers about the channel access failure.

A wireless device may access a channel on which UL transmission(s) are performed according to one of Type 1 or Type 2 UL channel access procedures.

If a random access response (RAR) message for successRAR scheduling a PUCCH transmission indicates Type 2 channel access procedures, the wireless device may use Type 2 channel access procedures.

A wireless device may use Type 1 channel access procedure for PRACH transmissions and/or PUSCH transmissions without user plane data related to random access procedure that initiates a channel occupancy. UL channel access priority class p=1 may be used by the wireless device for PRACH transmissions.

When a wireless device uses Type 2A, Type 2B, or Type 2C UL channel access procedures for PUSCH transmissions indicated by a UL grant or related to random access procedures, where the corresponding UL channel access priority p is not indicated, the wireless device may assume that the channel access priority class p=4 is used by the gNB/base station for the Channel Occupancy Time.

A wireless device may not transmit on a channel for a Channel Occupancy Time that exceeds T_ulm cot,p, where the channel access procedure is performed based on the channel access priority class p associated with the UE transmission(s).

A channel may refer to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration Tsl=9 microseconds (us). The sensing slot duration Tsl may be considered to be idle if an eNB/gNB/base station or a wireless device senses the channel during the sensing slot duration, and determines that the detected power for at least 4 us within the sensing slot duration is less than energy detection threshold X_thresh. Otherwise, the sensing slot duration Tsl may be considered to be busy.

A wireless device (or a MAC entity of the wireless device), for each random access (RA) preamble, may increment a preamble power ramping counter by 1, if an LBT failure indication was not received from lower layers for the last RA preamble transmission.

A wireless device (or a MAC entity of the wireless device), for each random access (RA) preamble, may instruct a physical layer to transmit the RA preamble using the selected PRACH occasion, corresponding RA-RNTI (if available), PREAMBLE_INDEX, and PREAMBLE_RECEIVED_TARGET_POWER. After instructing, if LBT failure indication is received from lower layers for the RA preamble/PRACH transmission, and if lbt-FailureRecoveryConfig is configured (e.g., by one or more configuration parameters), the wireless device may perform RA resource selection procedure. After instructing, if LBT failure indication is received from lower layers for the RA preamble/PRACH transmission, and if lbt-FailureRecoveryConfig is not configured, the wireless device may increment a preamble transmission counter by 1.

The wireless device (or a MAC entity of the wireless device) may set (e.g., determine, assign, use, and the like) a preamble transmission counter (or a value of the preamble transmission counter) to one. The wireless device may use the preamble transmission counter to count/track a number of preamble/PRACH transmissions. The wireless device may set the value of the preamble transmission counter to one, for example, prior to a transmission of a preamble for an RA procedure. The wireless device may set the value of the preamble transmission counter to one, for example, during/at/for an RA procedure initialization.

In an example, a preamble/PRACH transmission may be a preamble/PRACH retransmission based on (e.g., in response to, if, and the like) a value of the preamble transmission counter being greater than one. In an example, a preamble/PRACH transmission may be a preamble/PRACH retransmission based on (e.g., in response to, if, and the like) the preamble transmission counter being greater than one.

Once an RA preamble is transmitted and regardless of a possible occurrence of a measurement gap, the wireless device may start a time window (e.g., ra-ResponseWindow, msgB-ResponseWindow, and the like) configured in RACH-ConfigCommon and/or BeamFailureRecoveryConfig at the first PDCCH occasion from the end of the RA preamble/PRACH transmission.

If the time window expires and if a PDCCH transmission on the search space indicated by recoverySearchSpaceId addressed to the C-RNTI has not been received on the Serving Cell where the preamble was transmitted, the wireless device may consider an RA response (RAR) reception not successful. If the time window expires and if a PDCCH transmission on the search space indicated by recoverySearchSpaceId addressed to the C-RNTI has not been received on the Serving Cell where the preamble was transmitted, the wireless device may increment the preamble transmission counter.

If the time window expires and if an RAR comprising RA preamble identifiers that matches the transmitted PREAMBLE_INDEX has not been received, the wireless device may consider the RAR reception to be not successful. If the time window expires and if an RAR comprising RA preamble identifiers that matches the transmitted PREAMBLE_INDEX has not been received, the wireless device may increment the preamble transmission counter.

If the time window expires, and the RAR reception has not been considered as successful, the wireless device may increment the preamble transmission counter.

If (e.g., in response to, based on, and the like) the preamble transmission counter reaches/is equal to a maximum value (e.g., preamble TransMax, preamble TransMax+1, and the like), the wireless device may:

indicate a problem to upper layers (e.g., RRX layer) of the wireless device, e.g., if the RA preamble is transmitted on a SpCell; and/or consider the RA procedure to be unsuccessfully completed, e.g., if the RA preamble is transmitted on a SCell.

If the preamble transmission counter reaches the maximum value and if the RA preamble is transmitted on the SpCell, the wireless device may consider the RA procedure to be unsuccessfully completed if the RA procedure was triggered for system information (SI) request.

If the preamble transmission counter (or a value of the preamble transmission counter) is greater than one, the wireless device may increment a power ramping counter (e.g., by 1).

If (e.g., in response to, based on, and the like) the preamble transmission counter is less than the maximum value (e.g., preambleTransMax, preambleTransMax+1, and the like), the wireless device may:

select a random backoff time according to a uniform distribution between 0 and a PREAMBLE_BACK-OFF;

perform a RA resource selection procedure; and/or transmit a preamble for the RA procedure using/via one or more RA resources determined based on the RA resource selection procedure.

Lower layer(s) (e.g., Layer 1, physical layer, and the like) of the wireless device may perform an LBT procedure, according to which a transmission is not performed by the lower layer(s) if the channel is identified as being occupied. When the lower layer(s) performs an LBT procedure before a transmission and the transmission is not performed, an LBT failure indication may be sent to a MAC entity of the wireless device from the lower layer(s). When LBT is not performed by the lower layer(s), LBT failure indication may not be received from the lower layer(s).

The wireless device (or a MAC entity of the wireless device) may be configured by RRC (e.g., based on receiving one or more configuration parameters indicating) with a consistent LBT failure recovery procedure. Consistent LBT failure is detected per UL BWP by counting LBT failure indications, for all UL transmissions, from the lower layer(s) to the MAC entity of the wireless device. The one or more configuration parameters may indicate parameters for detection of consistent UL LBT failures for operation with shared spectrum channel access (e.g., LBT-FailureRecoveryConfig, LBT-FailureRecoveryConfig-r16, or the like). The wireless device may use an LBT counter to count a number of LBT failures. The wireless device may (e.g., initially) set the LBT counter (or a value of the LBT counter) to zero.

The wireless device may increment the LBT counter by 1, for example, if the wireless device fails to access a channel prior to a UL transmission (e.g., if the MAC entity receives an LBT failure indication from the lower layer(s). If the LBT counter (or a value of the LBT counter) is greater than (or equal to) an instance count (e.g., lbt-FailureInstanceMax-Count), the wireless device may trigger consistent LBT failure for the active UL BWP in a (serving) cell. If the cell is a SpCell and if consistent LBT failure has been triggered in all UL BWPs configured with PRACH occasions on same carrier in the cell, the wireless device (or a MAC entity of the wireless device) may indicate consistent LBT failure to upper layers (e.g., RRC layer, PDCP layer, and the like).

The wireless device may stop any ongoing RA procedure in the cell based on the LBT counter being greater than (or equal to) the instance count and the cell being an SCell. The wireless device may switch the active UL BWP to a UL BWP, on same carrier in the cell, configured with PRACH occasion and for which consistent LBT failure has not been triggered, based on the LBT counter being greater than (or equal to) the instance count and the cell being an SCell. The wireless device may initiate an RA procedure based on the LBT counter being greater than (or equal to) the instance count and the cell being an SCell.

The wireless device may set the LBT counter to 0 in response to all triggered consistent LBT failures being cancelled in the cell. The wireless device may set the LBT counter to 0 in response to an expiry of an LBT failure detection timer. The wireless device may set the LBT counter to 0 in response to the one or more configuration parameters reconfiguring the LBT failure detection timer and/or the instance count.

The wireless device may transmit an LBT failure MAC CE based on triggering a consistent LBT failure and UL-SCH resources being available for a new transmission in the cell and the UL-SCH resources being able to accommodate the LBT failure MAC CE plus a subheader of the MAC CE as a result of logical channel prioritization.

The wireless device may transmit an LBT failure MAC CE based on triggering a consistent LBT failure and UL-SCH resources being available for a new transmission in a cell for which consistent LBT failure has not been triggered and the UL-SCH resources can accommodate the LBT failure MAC CE plus a subheader of the MAC CE as a result of logical channel prioritization.

The wireless device may trigger a scheduling request for LBT failure MAC CE based on triggering a consistent LBT failure and UL-SCH resources not being available (or being unavailable) for a new transmission.

The wireless device may cancel all triggered consistent LBT failure(s) in SCell(s) for which consistent LBT failure was indicated in the transmitted LBT failure MAC CE based on a MAC PDU being transmitted and LBT failure indication not being received from the lower layer(s) and the MAC PDU includes the LBT failure MAC CE.

The wireless device may cancel all triggered consistent LBT failure(s) in the SpCell based on a consistent LBT failure being triggered and not cancelled in the SpCell and an RA procedure is considered successfully completed in the SpCell.

The wireless device may cancel all the triggered consistent LBT failure(s) in a cell based on the one or more configuration parameters reconfiguring the parameters for detection of consistent UL LBT failures for operation with shared spectrum channel access (e.g., LBT-FailureRecoveryConfig, LBT-FailureRecoveryConfig-r16, or the like) for the cell.

In existing technologies, a wireless device may determine to retransmit a preamble based on an LBT failure for accessing a channel. In an example, the wireless device may determine a plurality of repetitions of a preamble. The plurality of repetitions may comprise a first repetition and a second repetition. The wireless device may (successfully, e.g., without an LBT failure) transmit the first repetition of the preamble. The wireless device may not transmit the second repetition of the preamble, for example, based on/due to an LBT failure. In the implementation of the existing technologies, the wireless device may (determine to) retransmit a second preamble, for example, based on the LBT failure. In the implementation of the existing technologies, the wireless device may increment a preamble transmission counter, for example, based on the LBT failure. The base station may receive the first repetition of the preamble. The base station may (be able to) decode (e.g., receive) the preamble, for example, based on receiving the first repetition of the preamble (despite/and not receiving the second repetition of the preamble). The wireless device (re) transmitting the second plurality of repetitions of the second preamble may be unnecessary because of (or based on) the base station decoding (or being able to decode) the preamble based on receiving the first repetition of the preamble (and/despite not receiving the second repetition of the preamble). Unnecessary (re) transmission(s) of a preamble may lead to increase in power consumption at the wireless device and/or the base station, increase in latency (e.g., network access latency), underutilization/wastage of network resources, reduction in battery life of the wireless device, and/or reduction in throughput.

In light of the existing technologies, there is a need to improve procedure(s) for retransmission(s) of a preamble and/or handling preamble transmission counters when transmitting the preamble with a plurality of repetitions.

According to an example embodiment of the present disclosure, a wireless device may retransmit a preamble and/or increment a preamble transmission counter based on LBT failure(s) of each/every/any repetition of a plurality of repetitions of a preamble. For example, the wireless device may determine a plurality of repetitions of a preamble. The plurality of repetitions may comprise a first repetition and a second repetition.

In an example, a listen before talk with preamble repetitions method for a wireless device comprises the wireless device determining a first plurality of repetitions of a first preamble for a random-access procedure. In some embodiments of the present disclosure the wireless device may suspend a power-ramping counter based on not transmitting each repetition of the first plurality of repetitions of the first preamble. Finally, the wireless device may transmit a second preamble with a transmit power that is determined based on the suspended power-ramping counter for the random-access procedure.

In another example, a listen before talk with preamble repetitions method for a wireless device comprises the wireless device receiving from a base station one or more configuration parameters. The one or more configuration parameters comprise one or more listen before talk failure detection parameters. The method may further comprise the wireless device transmitting a plurality of repetitions of a first preamble for a random-access procedure. In some embodiments of the present disclosure, the method may also comprise the wireless device determining a value of a preamble transmission counter based on whether the number of listen before talk failures is less than the plurality of repetitions of the first preamble. In some embodiments of the present disclosure the wireless device may additionally/alternatively determine the value of the preamble transmission counter based on the one or more configuration parameters, where the one or more configuration parameters comprising the one or more listen before talk failure detection parameters. Finally, the wireless device may transmit a second preamble for the random-access procedure.

In another example, a listen before talk with preamble repetitions method for a wireless device comprises the wireless device receiving from a base station configuration parameters. The configuration parameters may comprise one or more listen before talk failure detection parameters. The method may further comprise the wireless device transmitting a plurality of repetitions of a first preamble for a random-access procedure. In some embodiments of the present disclosure the method may also comprise the wireless device setting a preamble transmission counter to a first value. The wireless may maintain the first value of the preamble transmission counter based on determining a listen before talk failure for each repetition of the plurality of repetitions of the first preamble. In some embodiments of the present disclosure the wireless device may additionally/alternatively determine the value of the preamble transmission counter based the configuration parameters. Finally, the wireless device may transmit a second preamble for the random-access procedure.

In another example, a listen before talk with preamble repetitions method for a wireless device comprises the wireless device receiving one or more configuration parameters. The one or more configuration parameters indicating a number of repetitions of a first preamble. The method further comprises the wireless device transmitting the number of repetitions of the first preamble for a first random-access procedure. In some embodiments of the present disclosure the method further comprises the wireless device determining a listen before talk failure for each repetition of the number of repetitions of the first preamble. The wireless device may also maintain a counter for determining a number of preamble transmissions. The number of preamble transmissions are based on determining by the wireless device of a listen before talk failure for each repetition of the number of repetitions of the first preamble. In some embodiments, the number of preamble transmissions are additionally/alternatively based on the one or more configuration parameters comprising a configuration for detection of listen before talk failure. Finally, the wireless device may transmit for a second random access procedure a preamble with the number of repetitions.

In another example, a listen before talk with preamble repetitions method for a wireless device comprises the wireless device receiving one or more configuration parameters. In some embodiments of the present disclosure the one or more configuration parameters comprise one or more listen before talk failure detection parameters. The method further comprises the wireless device transmitting a plurality of repetitions of a first preamble for a random-access procedure. The method also comprises the wireless device determining a value of a preamble transmission counter based on at least one of: not receiving a random-access response; expiry of a random-access response window; whether a number of listen before talk failures is less than the plurality of repetitions of the first preamble; the one or more configuration parameters; and transmitting, by the wireless device the plurality of repetitions of the first preamble. Finally, the wireless device may transmit a second preamble for the random-access procedure.

In another example, a listen before talk with preamble repetitions method for a wireless device comprises the wireless device receiving one or more configuration parameters. In some embodiments of the present disclosure the one or more configuration parameters comprise one or more listen before talk failure detection parameters. The method may also comprise the wireless device determining a plurality of repetitions of a first preamble for a random-access procedure. The method may also comprise the wireless device determining a value of a preamble transmission counter. The value of the preamble transmission counter may be based on whether the number of listen before talk failures to access a channel for transmitting the first preamble is less than the plurality of repetitions of the first preamble. In some embodiments, the value of the preamble transmission counter may additionally/alternatively be based on the one or more configuration parameters comprising the one or more listen before talk failure detection parameters. Finally, the wireless device may transmit a second preamble based on the value of the preamble transmission counter for the random-access procedure.

In an example, the wireless device may transmit the first repetition of the preamble (e.g., without LBT failure). The wireless device may not transmit the second repetition of the preamble, for example, based on an LBT failure (e.g., the wireless device may fail to access a channel prior to transmitting the second repetition of the preamble). The wireless device may not (or in response to the LBT failure, the wireless device may not) retransmit a second preamble, for example, based on transmitting the first repetition of the preamble. The wireless device may not (or in response to the LBT failure, the wireless device may not) increment a preamble transmission counter, for example, based on transmitting the first repetition of the preamble.

In another example, the wireless device may not transmit the first repetition of the preamble, for example, based on a first LBT failure. The wireless device may not transmit the second repetition of the preamble, for example, based on the second LBT failure. The wireless device may retransmit a second plurality of repetitions of a second preamble, for example, based on the first LBT failure and the second LBT failure (e.g., based on not transmitting each/every/any repetition of the plurality of repetitions of the preamble, or based on a number of LBT failures being equal to the plurality of repetitions). The wireless device may increment the preamble transmission counter, for example, based on the first LBT failure and the second LBT failure (e.g., based on not transmitting each/every/any repetition of the plurality of repetitions of the preamble, or based on the number of LBT failures being equal to the plurality of repetitions).

By not retransmitting a preamble in response to an (e.g., a single) LBT failure, the wireless device may receive a response from a base station, for example, based on the base station decoding/receiving (or being able to decode/receive) at least one repetition of a preamble transmitted by the wireless device. The wireless device may reduce unnecessarily retransmitting a preamble and/or unnecessarily incrementing a preamble transmission counter. As a result, power consumption at the wireless device and/or the base station may be reduced, latency may be reduced, underutilization/wastage of network resources may be reduced, battery life of the wireless device may be improved, and/or throughput may be improved.

Figure 17:
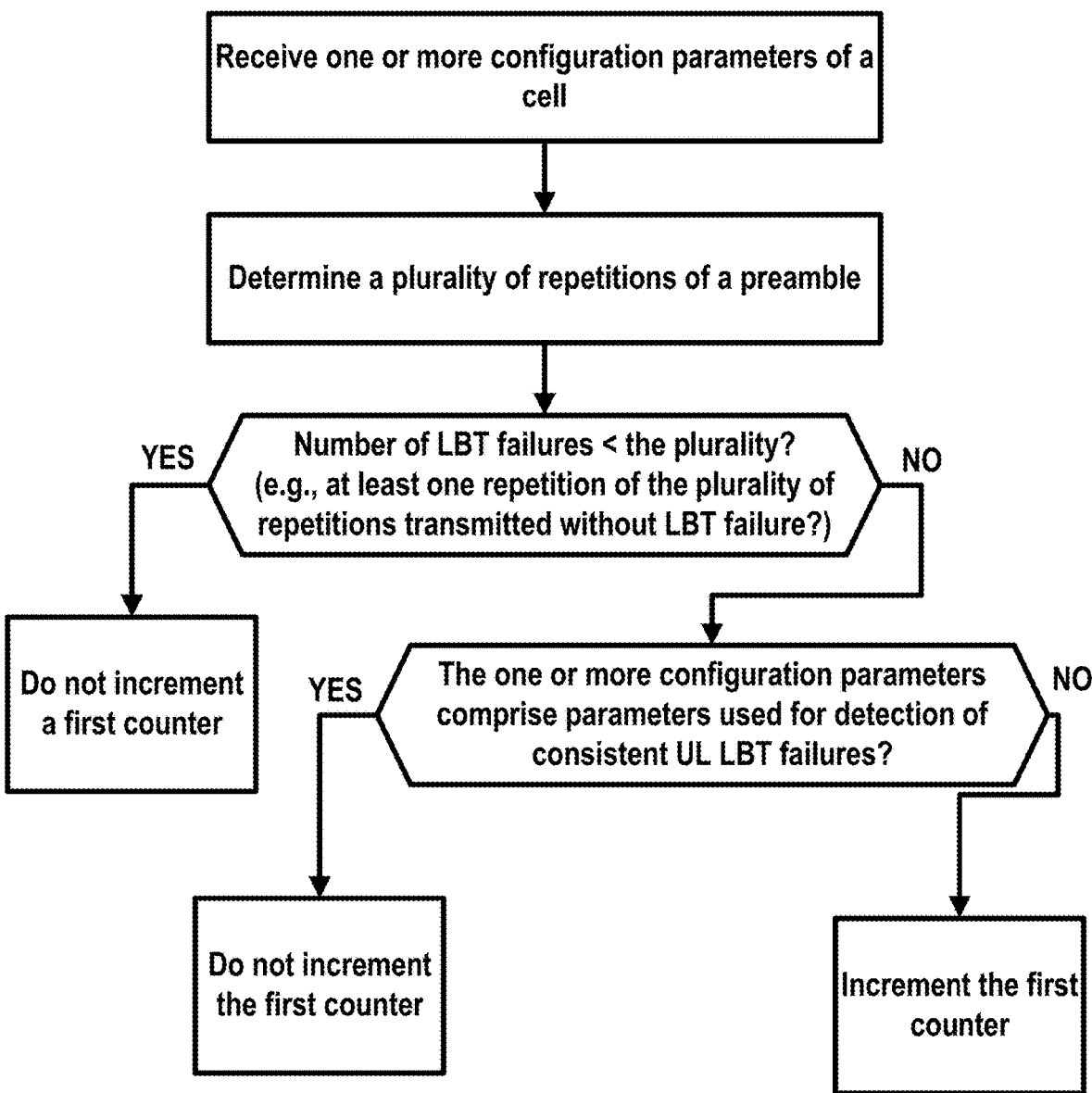
FIG. 17 shows an example flow diagram as per an aspect of an embodiment of the present disclosure.

FIG. 17 shows an example flow diagram as per an aspect of an embodiment of the present disclosure. According to the example of FIG. 17, a wireless device may receive one or more configuration parameters of/for a cell. The wireless device may receive the one or more configuration parameters from a base station. The base station may transmit the one or more configuration parameters to one or more wireless devices. The one or more wireless devices may comprise the wireless device.

The cell may be, for example, a serving cell of/for the wireless device. The wireless device may, for example, be in the cell. The cell may be, for example, an unlicensed cell (e.g., shared spectrum channel access cell). The cell may be, for example, a primary cell (PCell). The cell may be, for example, a secondary cell (SCell). The cell may be, for example, a primary secondary cell (PSCell). The cell may be, for example, a special cell (SpCell). The cell may be, for example, a non-terrestrial network (NTN) cell. The cell may be part of a master cell group (MCG). The cell may be part of a secondary cell group (SCG). The base station may, for example, serve the cell.

The one or more configuration parameters may be, for example, one or more broadcast configuration parameters. The one or more configuration parameters may be, for example, radio resource control (RRC) configuration parameters. The one or more configuration parameters may be, for example, system information parameters.

The wireless device may, for example, receive one or more messages comprising the one or more configuration parameters. The one or more messages may be, for example, one or more RRC messages (e.g., RRC setup message, RRC release message, RRC reconfiguration message, and the like). The one or more messages may be, for example, one or more system information messages (e.g., system information block (SIB), SIB1, SIB2, and the like).

The one or more configuration parameters may comprise/ indicate a plurality of RSs. The plurality of RSs may be, for example, a plurality of SSBs. The plurality of RSs may be, for example, a plurality of SS/PBCH blocks. The plurality of RSs may be, for example, a plurality of CSI-RSs. The plurality of RSs may be, for example, a plurality of CRSs. The plurality of RSs may be a plurality of sounding RSs (SRSs). The plurality of RSs may be a plurality of positioning RSs (PRSs).

An RS (e.g., from/among the plurality of RSs) may be, for example, an SSB. An RS may be, for example, an SS/PBCH block. An RS may be, for example, a CSI-RS. An RS may be, for example, a CRS. An RS may be, for example, a PRS. An RS may be, for example, an SRS.

Each RS of the plurality of RSs may be associated with a respective radio link quality. For example, the plurality of RSs may comprise a first RS and a second RS. The first RS may be associated with a first radio link quality. The second RS may be associated with a second radio link quality. The wireless device may determine (e.g., measure, calculate, compute, estimate, and the like) the first radio link quality, for example, based on measuring the first RS. The wireless device may determine the second radio link quality, for example, based on measuring the second RS.

In an example, a radio link quality of an RS may be a reference signal received power (RSRP) of the RS. The wireless device may determine the radio link quality of the RS by determining (e.g., measuring, estimating, calculating, computing, and the like) the RSRP of the RS. In an example, the radio link quality of an RS may be a received signal strength indication (RSSI) of the RS. The wireless device may determine the radio link quality of the RS by determining (e.g., measuring, estimating, calculating, computing, and the like) the RSSI of the RS. In an example, the radio link quality of an RS may be a reference signal received quality (RSRQ) of the RS. The wireless device may determine the radio link quality of the RS by determining (e.g., measuring, estimating, calculating, computing, and the like) the RSRQ of the RS. In an example, the radio link quality of an RS may be a signal to noise ratio (SNR) of the RS. The wireless device may determine the radio link quality of the RS by determining (e.g., measuring, estimating, calculating, computing, and the like) the SNR of the RS. In an example, the radio link quality of an RS may be a signal to interference plus noise ratio (SINR) of the RS. The wireless device may determine the radio link quality of the RS by determining (e.g., measuring, estimating, calculating, computing, and the like) the SINR of the RS. In an example, the radio link quality of an RS may be a block error rate (BLER) of the RS. The wireless device may determine the radio link quality of the RS by determining (e.g., measuring, estimating, calculating, computing, and the like) the BLER of the RS. In an example, the radio link quality of an RS (e.g., SSB) may be a SS-RSRP of the RS (e.g., SSB). The wireless device may determine the radio link quality of the RS by determining (e.g., measuring, estimating, calculating, computing, and the like) the SS-RSRP of the RS.

The wireless device may select (e.g., determine, choose, pick, use, apply, and the like) an RS among (e.g., from, from among, amongst, from a set of, and the like) the plurality of RSs for a random access (RA) procedure. For example, the wireless device may select an RS among the plurality of RSs at random. In another example, the wireless device may select an RS associated with a highest (e.g., best, high, greatest, and the like) radio link quality. In another example, the wireless device may select an (e.g., any) RS associated with a radio link quality that is higher (e.g., greater, larger, more, and the like) than a threshold (e.g., selection threshold, power threshold, rsrp-ThresholdSSB, rsrp-Threshold-CSI-RS, rsrp-ThresholdSSB-SUL, and the like).

The wireless device may determine (e.g., select, choose, obtain, and the like) one or more resources (e.g., PRACH resources, RACH resources, RA resources, MsgA resources, PUSCH resources, uplink resources, uplink radio resources, radio resources, preambles, preamble groups, preamble types, features, feature priorities, random access resource sets, PRACH configurations, time and/or frequency resources, PRACH configuration offsets, PRACH configuration indexes, PRACH configuration period scalings, RACH occasions (ROs), PRACH occasion indexes, RACH occasion indexes, scaling factors, mask indexes, preamble start indexes, starting preambles for a partition, and the like), for example, for the RA procedure. The wireless device may determine the one or more resources, for example, based on the selected RS. In an example, a first RS may be associated with one or more first resources. A second RS may be associated with, for example, one or more second resources. The wireless device may select, for example, the first RS for the RA procedure. The wireless device may determine one or more first resources for the RA procedure, for example, based on selecting the first RS.

In an example, the wireless device may select the first RS for the RA procedure. The wireless device may determine (e.g., select, choose, and the like) a first preamble for the RA procedure. The wireless device may determine the first preamble, for example, based on selecting the first RS.

In an example, a preamble may be associated with a number of repetitions. In an example, the number of repetitions of the preamble may be associated with a level (e.g., enhanced coverage level, coverage enhancement (CE) level, repetition level, coverage level, and the like). There may be, for example, a one-to-one mapping between the number of repetitions and the level. For example, the base station may indicate (e.g., via the one or more configuration parameters) a plurality of levels. The plurality of levels may be associated with a plurality of number of repetitions (of a preamble). Each level of the plurality of levels may be associated with a respective number of repetitions of the plurality of number of repetitions. In an example, the plurality of levels may comprise a first level, a second level, a third level, and a fourth level. The first level, the second level, the third level, and the fourth level may be different from each other. No two or more levels of the first level, the second level, the third level, and the fourth level may be the same as each other. The plurality of numbers of repetitions may comprise a first number of repetitions, a second number of repetitions, a third number of repetitions, and a fourth number of repetitions. No two or more number of repetitions of the first number of repetitions, the second number of repetitions, the third number of repetitions, and the fourth number of repetitions may be the same as each other. The first number of repetitions may be associated with the first level. The second number of repetitions may be associated with the second level. The third number of repetitions may be associated with the third level. The fourth number of repetitions may be associated with the fourth level.

In an exemplary embodiment, the wireless device may determine a number of repetitions of a preamble based on determining (e.g., selecting, choosing, estimating, considering to be, and the like) a level. The wireless device may determine the level, for example, based on measuring a RS. The wireless device may determine the level, for example, based on a radio link quality of a RS. For example, the wireless device may select a first RS among a plurality of RSs for an RA procedure. The first RS may be associated with a first radio link quality. For example, the wireless device may determine the first radio link quality of the first RS based on measuring the first RS.

The wireless device may determine a level, for example, based on comparing the first radio link quality against one or more thresholds. The one or more thresholds may be indicated by the base station to the wireless device. The one or more thresholds may be indicated, for example, via the one or more configuration parameters. The one or more thresholds may be used, by the wireless device, for determining the level (e.g., level of the wireless device). In an example, a number of thresholds indicated by the base station may be one less than a number of levels indicated (e.g., configured, supported, and the like) by the base station for the wireless device.

In an exemplary embodiment, the one or more threshold may comprise a first threshold. The one or more threshold may comprise a second threshold and a third threshold. The wireless device may compare the first radio link quality of the first RS (e.g., the selected RS) against the first threshold. In an example, the first radio link quality of the first RS may be higher (e.g., greater, more, bigger, stronger, better, and the like) than the first threshold. The wireless device may determine the level (of the wireless device) to be a first level. In another example, the first radio link quality of the first RS may be lower (e.g., less, weaker, worse, smaller, and the like) than the first threshold. The wireless device may compare the first radio link quality of the first RS against the second threshold, for example, based on the first radio link quality of the first RS being lower than the first threshold. In an example, the first radio link quality of the first RS may be higher than the second threshold. The wireless device may determine the level to be a second level, for example, based on the first radio link quality of the first RS being higher than the second threshold. In another example, the first radio link quality of the first RS may be lower than the second threshold (and the first threshold). The wireless device may compare the first radio link quality of the first RS against the third threshold, for example, based on the first radio link quality of the first RS being lower than the second threshold (and the first threshold). In an example, the first radio link quality of the first RS may be higher than the third threshold. The wireless device may determine the level to be a third level, for example, based on the first radio link quality of the first RS being higher than the third threshold (and lower than the second threshold and the first threshold). In another example, the first radio link quality of the first RS may be lower than the third threshold (and the second threshold and the first threshold). The wireless device may determine the level to be a fourth level, for example, based on the first radio link quality of the first RS being lower than the third threshold (and the second threshold and the first threshold).

In an exemplary embodiment, the wireless device may determine the level as below:
- if the first radio link quality of the first RS is higher than the first threshold, the wireless device may determine the level to be a first level.
- else, if the first radio link quality of the first RS is higher than the second threshold, the wireless device may determine the level to be a second level.
- else, if the first radio link quality of the first RS is higher than the third threshold, the wireless device may determine the level to be a third level.
- else, the wireless device may determine the level to be a fourth level.

In an exemplary embodiment, the wireless device may determine the level to be a first level. The first level may be associated with a first number of repetitions. The wireless device may determine to use the first number of repetitions of a first preamble, for example, based on determining the level to be the first level. In another example, the wireless device may determine the level to be a second level. The second level may be associated with a second number of repetitions. The wireless device may determine to use the second number of repetitions of a first preamble, for example, based on determining the level to be the second level. In another example, the wireless device may determine the level to be a third level. The third level may be associated with a third number of repetitions. The wireless device may determine to use the third number of repetitions of a first preamble, for example, based on determining the level to be the third level. In another example, the wireless device may determine the level to be a fourth level. The fourth level may be associated with a fourth number of repetitions. The wireless device may determine to use the fourth number of repetitions of a first preamble, for example, based on determining the level to be the fourth level. In an example, the first number of repetitions may be less than the second number of repetitions. The second number of repetitions may be less than the third number of repetitions. The third number of repetitions may be less than the fourth number of repetitions.

In the example of FIG. 17, the wireless device may determine a number/plurality of repetitions of a preamble for an RA procedure. The wireless device may determine the number/plurality of repetitions, for example, based on a radio link quality of an RS that is selected from a plurality of RSs indicated by the one or more configuration parameters.

Determining the number/plurality of repetitions of the preamble may, for example, comprise a medium access control (MAC) layer (e.g., upper layer, higher layer, Layer 2, Layer 3, and the like) or a MAC entity of the wireless device instructing (e.g., transmitting, requesting, and the like) a physical layer (e.g., lower layer, Layer 1, and the like) of the wireless device to transmit the number/plurality of repetitions of the preamble. Determining the number/plurality of repetitions of the preamble may comprise, for example, the MAC layer/entity of the wireless device instructing the physical layer of the wireless device to transmit the number/plurality of repetitions of the preamble using an RA occasion, RA-RNTI, preamble index, and/or a transmit power, that is/are determined based on the (selected) RS.

In the example of FIG. 17, the cell may be an unlicensed cell (e.g., operating with/using shared spectrum channel access). The wireless device (e.g., Layer 1 of the wireless device) may (try to, attempt to, and the like) access a channel for transmitting the number/plurality of repetitions of the preamble (e.g., PRACH transmission). For example, the wireless device may perform a channel access procedure (e.g., sensing the channel to evaluate the availability of the channel for performing one or more transmissions (e.g., PRACH transmission)). If the wireless device (e.g., Layer 1 of the wireless device) fails to access the channel prior to the PRACH transmission, the Layer 1 of the wireless device may notify higher layers (e.g., MAC layer) about the channel access failure. The channel access failure may be, for example, an LBT failure.

According to the example of FIG. 17, the wireless device may determine to increment (or determine a value of) a first counter (e.g., preamble transmission counter), for example, based on whether a number of LBT failures (or a number of LBT failure indications) is less than the number/plurality of repetitions of the preamble. In an example, a MAC entity of the wireless device may handle (e.g., maintain, increment, decrement, and the like) the first counter (e.g., preamble transmission counter). According to the example of FIG. 17, the wireless device may determine to increment (or determine a value of) a first counter (e.g., preamble transmission counter), for example, based on whether the one or more configuration parameters comprise the parameters for detection of consistent UL LBT failures for operation with shared spectrum channel access.

In an example, the wireless device may use a third counter to count/track the number of LBT failures of transmitting the preamble. The third counter may be, for example, the LBT counter. The third counter may be, for example, a RA preamble LBT counter. The wireless device may determine the number of LBT failures, for example, based on a difference between two values of the third counter. The two values may comprise a first value. The two values may comprise a second value. The wireless device may determine to transmit the number/plurality of repetitions of the preamble. The first value may be a value of the third counter, for example, prior to transmitting the number/plurality of repetitions of the preamble (e.g., at/prior to a MAC entity of the wireless device instructing the physical layer of the wireless device to transmit the number/plurality of repetitions of the preamble). The second value may be a value of the third counter, for example, after transmitting (zero or one or more repetitions of) the number/plurality of repetitions of the preamble. The number of LBT failures may be, for example, the second value minus the first value.

In an example, the number/plurality of repetitions of the preamble may comprise, for example, a first repetition of the preamble. The number/plurality of repetitions of the preamble may comprise, for example, a second repetition of the preamble. In an example, the wireless device may transmit the number/plurality of repetitions of the preamble for the RA procedure.

The wireless device may, for example, transmit the first repetition of the preamble without an LBT failure (e.g., without failing to access the channel for transmitting the first repetition of the preamble, successfully accessing the channel for transmitting the first repetition of the preamble, and the like). For example, the wireless device may (successfully) access the channel to transmit the first repetition of the preamble. The wireless device may not transmit the second repetition of the preamble, for example, based on an LBT failure. For example, the wireless device may fail to access the channel to transmit the second repetition of the preamble. The number of LBT failures for the preamble/PRACH transmission may be one, for example, based on the wireless device transmitting the first repetition of the preamble (e.g., without an LBT failure) and the wireless device not transmitting the second repetition of the preamble (e.g., based on/due to the LBT failure).

The number/plurality of repetitions may be/comprise, for example, two repetitions. The number of LBT failures may be one. The number of LBT failures may be, for example, less (e.g., lower, smaller, weaker, and the like) than (or not equal to) the number/plurality of repetitions of the preamble. In the example of FIG. 17, the wireless device may not increment the first counter (e.g., preamble transmission counter) based on the number of LBT failures being less than (or not equal to) the number/plurality of repetitions of the preamble. In the example of FIG. 17, the wireless device may not increment the first counter (e.g., preamble transmission counter) based on transmitting the first repetition of the preamble (e.g., without an LBT failure). In the example of FIG. 17, the wireless device may not increment the first counter (e.g., preamble transmission counter) based on transmitting at least X (where X may be 1, 2, half of the number/plurality, two thirds of the number/plurality, and the like) repetition(s) (e.g., the first repetition) of the number/plurality of repetitions of the preamble.

The wireless device may not transmit a second preamble (e.g., PRACH retransmission, retransmission of the first preamble, and the like), for example, based on transmitting at least X (where X may be 1, 2, half of the number/plurality, two thirds of the number/plurality, and the like) repetition(s) (e.g., the first repetition) of the number/plurality of repetitions of the preamble. The wireless device may not select one or more RA resources for transmitting the second preamble, for example, based on transmitting at least X (where X may be 1, 2, half of the number/plurality, two thirds of the number/plurality, and the like) repetition(s) (e.g., the first repetition) of the number/plurality of repetitions of the preamble.

In another example, the wireless device may not transmit (e.g., may fail to transmit) the first repetition of the preamble, for example, based on a first LBT failure. The wireless device may not transmit (e.g., may fail to transmit) the second repetition of the preamble, for example, based on a second LBT failure. The number of LBT failures may be two, for example, based on the wireless device not transmitting the first repetition of the preamble based on the first LBT failure and the wireless device not transmitting the second repetition of the preamble based on the second LBT failure. The number/plurality of repetitions may be, for example, two repetitions. The number of LBT failures may, for example, be equal to (or not less than) the number/plurality of repetitions.

In an example, the one or more configuration parameters may comprise parameters used for detection of consistent UL LBT failures for operation with shared spectrum channel access (e.g., LBT-FailureRecoveryConfig, LBT-FailureRecoveryConfig-r16, or the like). According to the example of FIG. 17, the wireless device may not increment (e.g., may maintain, may retain, may suspend, may keep the same, and the like) the first counter, for example, based on the one or more configuration parameters comprising parameters used for detection of consistent UL LBT failures for operation with shared spectrum channel access and the number of LBT failures being equal to (or not less than) the number/plurality of repetitions. The wireless device may not increment the first counter, for example, based on the number of LBT failures being equal to (or not less than) the number/plurality of repetitions.

In another example, the one or more configuration parameters may not comprise the parameters used for detection of consistent UL LBT failures for operation with shared spectrum channel access (e.g., LBT-FailureRecoveryConfig, LBT-FailureRecoveryConfig-r16, or the like). According to the example embodiment of FIG. 17, the wireless device may increment the first counter, for example, based on the one or more configuration parameters not comprising parameters used for detection of consistent UL LBT failures for operation with shared spectrum channel access and the number of LBT failures being equal to (or not less than) the number/plurality of repetitions. The wireless device may increment the first counter, for example, based on the number of LBT failures being equal to (or not less than) the number/plurality of repetitions.

In an example, the first counter (e.g., a value of the first counter, the first counter after the wireless device increments the first counter, and the like) may be less than a maximum number of RA preamble transmission (e.g., preamble Trans-Max, msgA-TransMax, and the like). The wireless device may transmit a second preamble, for example, based on the first counter being less than the maximum number of RA preamble transmissions. The wireless device may transmit a second preamble, for example, based on the number of LBT failures being equal to (or not less than) the number/plurality of repetitions. The wireless device may transmit a second preamble, for example, based on the first counter being less than the maximum number of RA preamble transmissions and the number of LBT failures being equal to (or not less than) the number/plurality of repetitions.

The wireless device may determine (e.g., select, pick, choose, use, apply, and the like) one or more RA resources to transmit the second preamble, for example, based on the number of LBT failures being equal to (or not less than) the number/plurality of repetitions. The wireless device may determine the one or more RA resources to transmit the second preamble, for example, based on the first counter being less than the maximum number of RA preamble transmissions and the number of LBT failures being equal to (or not less than) the number/plurality of repetitions.

Figure 18:
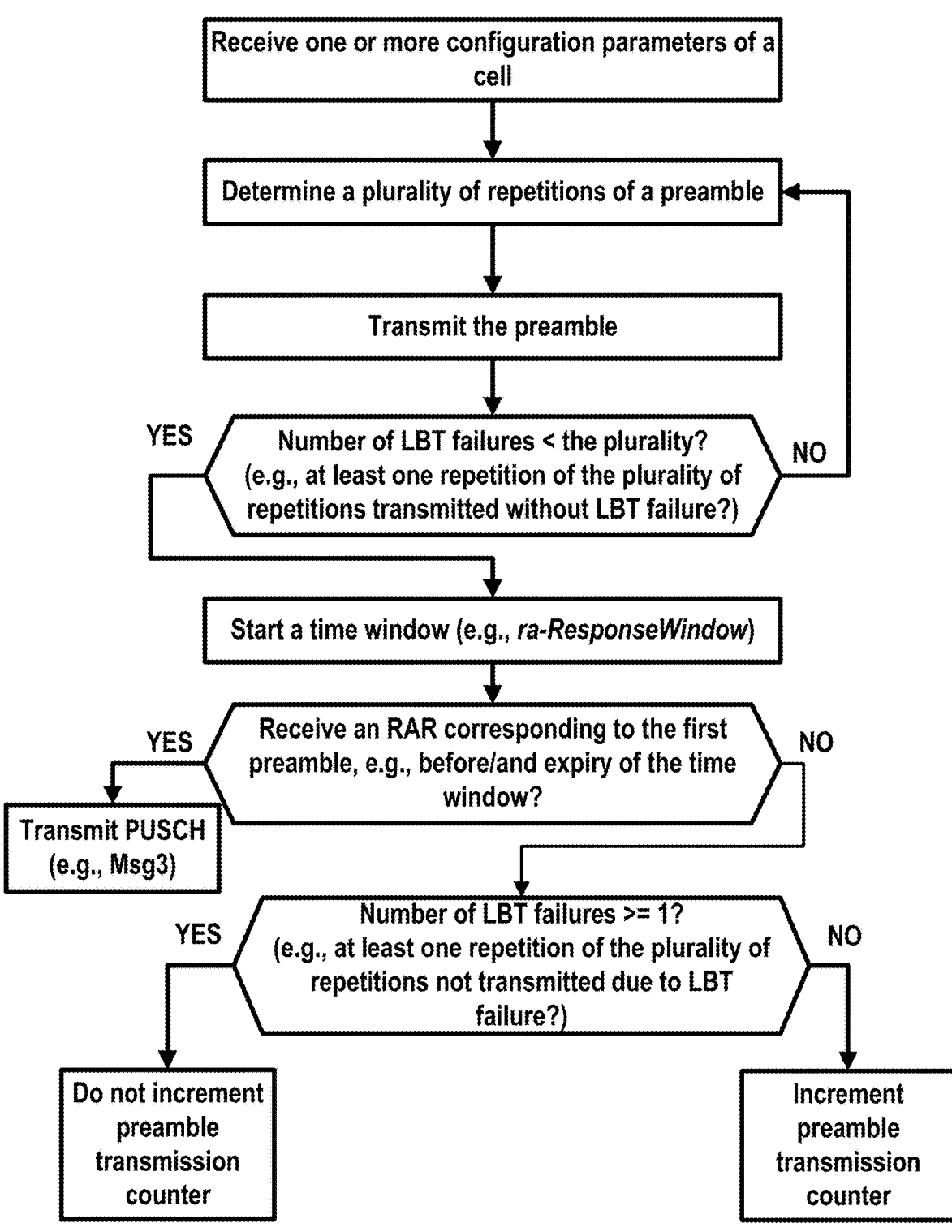
FIG. 18 shows an example flow diagram as per an aspect of an embodiment of the present disclosure.

FIG. 18 shows an example flow diagram as per an aspect of an embodiment of the present disclosure. According to the example of FIG. 18, a wireless device may receive one or more configuration parameters of/for a cell from a base station. The wireless device may determine a number/plurality of repetitions of a preamble. The wireless device may determine the number/plurality of repetitions, for example, based on the one or more configuration parameters. For example, the one or more configuration parameters may indicate a plurality of RSs. The wireless device may select one or more RSs of the plurality of RSs for an RA procedure. The wireless device may determine the number/plurality of repetitions of the preamble for the RA procedure, for example, based on one or more radio link qualities of the one or more RSs.

In an example, the wireless device may transmit (zero or) one or more repetitions, of the number/plurality of repetitions, of the preamble.

In an example, the number/plurality of repetitions of the preamble may comprise a first repetition of the preamble. The number/plurality of repetitions of the preamble may comprise a second repetition of the preamble.

In an example, the wireless device may not transmit (e.g., may fail to transmit) the first repetition of the preamble based on (or due to) an LBT failure. For example, the wireless device may fail to access a channel prior to/before/to transmit (or transmitting) the first repetition of the preamble. The wireless device may not transmit (e.g., may fail to transmit) the second repetition of the preamble based on (or due to) an LBT failure. For example, the wireless device may fail to access a channel prior to/before/to transmit (or transmitting) the second repetition of the preamble.

A number of LBT failures may be equal to two, for example, based on the wireless device not transmitting the first repetition of the preamble based on (or due to) an LBT failure and not transmitting the second repetition of the preamble based on (or due to) an LBT failure. The number/plurality of repetitions may be equal to two repetitions of the preamble. The number of LBT failures may be equal to (or not less than) the number/plurality of repetitions of the preamble.

The wireless device may not start (e.g., begin, run, and the like) a time window (e.g., ra-ResponseWindow, MsgB-ResponseWindow, and the like), for example, based on not transmitting (e.g., failing to transmit) the first repetition of the preamble and the second repetition of the preamble. The wireless device may not start the time window, for example, based on the number of LBT failures being equal to (or not less than) the number/plurality of repetitions of the preamble.

In another example, the wireless device may transmit the first repetition of the preamble, e.g., without an LBT failure. For example, the wireless device may access (e.g., may not fail to access) the channel prior to/before/to transmit (or transmitting) the first repetition of the preamble. The wireless device may not transmit (or fail to transmit) the second repetition of the preamble, e.g., based on/due to an LBT failure. For example, the wireless device may fail to access the channel prior to/before/to transmit (or transmitting) the second repetition of the preamble.

A number of LBT failures may be equal to one, for example, based on the wireless device transmitting the first repetition of the preamble (e.g., without an LBT failure) and not transmitting the second repetition of the preamble based on (or due to) an LBT failure. The number/plurality of repetitions may be equal to two repetitions of the preamble. The number of LBT failures may be less than (or not equal to) the number/plurality of repetitions of the preamble.

The wireless device may start the time window (e.g., ra-ResponseWindow, MsgB-Response Window, and the like), for example, based on transmitting the first repetition of the preamble without an LBT failure and not transmitting (or failing to transmit) the second repetition of the preamble based on/due to an LBT failure. The wireless device may start the time window, for example, based on transmitting at least X (where X may be 1, 2, half of the number/plurality, two thirds of the number/plurality and the like) repetition(s), of the number/plurality of repetitions, of the preamble, e.g., without LBT failure (or without failing to access the channel). The wireless device may start the time window, for example, based on the number of LBT failures being less than (or not equal to) the number/plurality of repetitions of the preamble.

In an example, the wireless device may receive a response (e.g., RAR, MsgB, PDCCH, Msg4, RAR comprising Random Access Preamble identifiers that matches the transmitted PREAMBLE_INDEX (e.g., an index of the preamble) and the like). The wireless device may receive the response, for example, from the base station. The wireless device may receive the response, for example, within (or before expiry of) the time window. The wireless device may transmit an uplink signal (e.g., Msg3, PUSCH, PUCCH) and the like, for example, based on receiving the response.

In an example, the wireless device may not receive a response (e.g., RAR, MsgB, PDCCH, Msg4, RAR comprising Random Access Preamble identifiers that matches the transmitted PREAMBLE_INDEX (e.g., an index of the preamble) and the like) prior to/before expiry of/within the time window.

In the example of FIG. 18, wireless device may determine whether to increment the first counter (e.g., preamble transmission counter) based on the number of LBT failures is greater (e.g., more, higher, above, and the like) than X (where X may be 1, 2, half of the number/plurality, two thirds of the number/plurality, and the like) (e.g., at least X (where X may be 1, 2, half of the number/plurality, two thirds of the number/plurality, and the like) repetition(s) of the number/plurality of repetitions are not transmitted due to LBT failure), whether the wireless device received a response from the base station within/before the expiry of the time window, and/or whether the number of LBT failures is less than the number/plurality of repetitions.

In an example, the wireless device may determine to increment the first counter (e.g., preamble transmission counter) based on the number of LBT failures is greater (e.g., more, higher, above, and the like) than X (where X may be 1, 2, half the number/plurality, two thirds the number/plurality, and the like) (e.g., at least X (where X may be 1, 2, half of the number/plurality, two thirds of the number/plurality and the like) repetition(s) of the number/plurality of repetitions are not transmitted due to LBT failure). The wireless device may determine to increment the first counter (e.g., preamble transmission counter), for example, based on not receiving a response (e.g., RAR, MsgB, PDCCH, Msg4, RAR comprising Random Access Preamble identifiers that matches the transmitted PREAMBLE_INDEX (e.g., an index of the preamble) and the like) prior to/before expiry of/within the time window. The wireless device may determine to increment the first counter (e.g., preamble transmission counter), for example, based on the number of LBT failures being less (e.g., lower, fewer, smaller, weaker, and the like) than the number/plurality of repetitions. The wireless device may determine to increment the first counter (e.g., preamble transmission counter) based on (e.g., if, in response to, due to, and the like) the number of LBT failures is greater (e.g., more, higher, above, and the like) than X (where X may be 1, 2, half of the number/plurality, two thirds of the number/plurality and the like) (e.g., at least X (where X may be 1, 2, half of the number/plurality, two thirds of the number/plurality and the like) repetition(s) of the number/plurality of repetitions are not transmitted due to LBT failure), not receiving a response (e.g., RAR, MsgB, PDCCH, Msg4, RAR comprising Random Access Preamble identifiers that matches the transmitted PREAMBLE_INDEX (e.g., an index of the preamble) and the like) prior to/before expiry of/within the time window, and/or the number of LBT failures being less than the number/plurality of repetitions.

In an example, the wireless device may transmit the first repetition of the preamble (e.g., without an LBT failure, without failing to access the channel prior to transmitting the first repetition of the preamble). The wireless device may, for example, transmit the second repetition of the preamble (e.g., without an LBT failure, without failing to access the channel prior to transmitting the first repetition of the preamble). The number of LBT failures may be zero, for example, based on the wireless device transmitting the first repetition of the preamble (e.g., without an LBT failure, without failing to access the channel prior to transmitting the first repetition of the preamble) and the second repetition of the preamble (e.g., without an LBT failure, without failing to access the channel prior to transmitting the first repetition of the preamble).

In an example, the wireless device may not increment the first counter (e.g., preamble transmission counter) based on (e.g., if, in response to, due to, and the like) transmitting the first repetition of the preamble (e.g., without an LBT failure, without failing to access the channel prior to transmitting the first repetition of the preamble) and the second repetition of the preamble (e.g., without an LBT failure, without failing to access the channel prior to transmitting the first repetition of the preamble). The wireless device may not increment the first counter (e.g., preamble transmission counter), for example, based on (e.g., if, in response to, due to, and the like) the number of LBT failures being (e.g., equal to or substantially equal to) zero.

Figure 19:
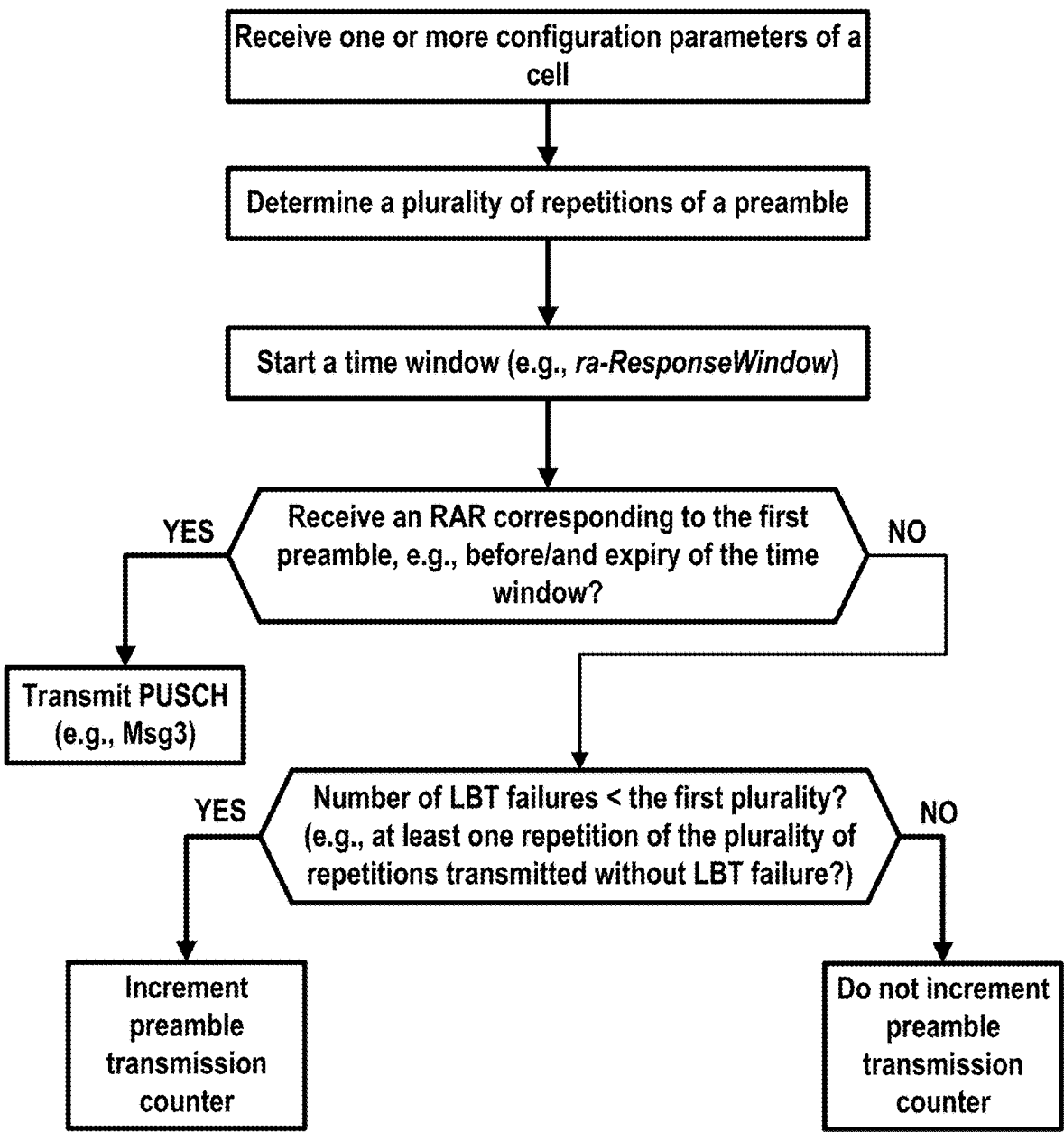
FIG. 19 shows an example flow diagram as per an aspect of an embodiment of the present disclosure.

FIG. 19 shows an example flow diagram as per an aspect of an embodiment of the present disclosure. According to the example of FIG. 19, a wireless device may receive one or more configuration parameters of/for a cell from a base station. The wireless device may determine a number/plurality of repetitions of a preamble for an RA procedure. The wireless device may determine the number/plurality of repetitions, for example, based on the one or more configuration parameters.

The wireless device may, for example, transmit the number/plurality (or zero, one or more of the number/plurality) of repetitions of the preamble. For example, a MAC entity of a wireless device may instruct (e.g., indicate, request, ask, and the like) a physical layer (e.g., lower layer) of the wireless device to transmit the number/plurality of repetitions of the preamble. In an example, the wireless device may transmit the number/plurality of repetitions of the preamble (e.g., without LBT failure for any/each repetition, of the number/plurality of repetitions, of the preamble). In another example, the wireless device may not transmit one or more repetitions, of the number/plurality of repetitions, of the preamble, for example, based on/due to one or more LBT failures.

The wireless device may start a time window (e.g., ra-Response Window, MsgB-ResponseWindow, and the like) after transmitting the preamble (e.g., after the MAC entity of the wireless device instructs the physical layer of the wireless device to transmit the number/plurality of repetitions of the preamble). The wireless device may start the time window, for example, regardless of whether any repetition, of the number/plurality of repetitions, of the preamble is/was/were/are not transmitted based on/due to LBT failure(s).

In an example, the wireless device may receive a response (e.g., RAR, MsgB, PDCCH, Msg4, RAR comprising RA preamble identifier(s) that matches a transmitted PREAMBLE_INDEX (e.g., an index of the preamble) and the like). The wireless device may receive the response, for example, from the base station. The wireless device may receive the response, for example, within (or before expiry of) the time window. The wireless device may transmit an uplink signal (e.g., Msg3, PUSCH, PUCCH) and the like, for example, based on receiving the response (e.g., regardless of LBT failure(s).

In an example, the wireless device may not receive a response (e.g., RAR, MsgB, PDCCH, Msg4, RAR comprising RA preamble identifier(s) that matches a transmitted PREAMBLE_INDEX (e.g., an index of the preamble) and the like) from the base station. The wireless device may not receive the response, for example, before/prior to/and/within an expiry of the time window.

In an example, the number/plurality of repetitions may comprise a first repetition. The number/plurality of repetitions may comprise, for example, a second repetition.

The wireless device may transmit the first repetition of the preamble, for example, without an LBT failure. The wireless device may not transmit the second repetition of the preamble, for example, based on/due to an LBT failure. A number of LBT failures may be one, for example, based on the wireless device transmitting the first preamble (e.g., without an LBT failure) and the wireless device not transmitting the second preamble (e.g., based on/due to an LBT failure). The number/plurality of repetitions may be, for example, two repetitions. The number of LBT failures may be less (or not equal to) than the number/plurality of repetitions.

The wireless device may increment a first counter (e.g., preamble transmission counter), for example, based on the number of LBT failures being less than (or not equal to) the number/plurality of repetitions. The wireless device may increment the first counter (e.g., preamble transmission counter), for example, based on transmitting at least X (where X may be 1, 2, half of the number/plurality, two thirds of the number/plurality, and the like) repetition(s) (e.g., the first repetition), of the number/plurality of repetitions, of the preamble, e.g., without an LBT failure. The wireless device may increment the first counter (e.g., preamble transmission counter), for example, based on the number of LBT failures being less than (or not equal to) the number/plurality of repetitions and/or not receiving a response (e.g., RAR, MsgB, PDCCH, Msg4, RAR comprising RA preamble identifier(s) that matches a transmitted PREAMBLE_INDEX (e.g., an index of the preamble) and the like) before/prior to/and/within an expiry of the time window. The wireless device may increment the first counter (e.g., preamble transmission counter), for example, based on transmitting at least X (where X may be 1, 2, half of the number/plurality, two thirds of the number/plurality, and the like) repetition(s) (e.g., the first repetition), of the number/plurality of repetitions, of the preamble, e.g., without an LBT failure and/or not receiving a response (e.g., RAR, MsgB, PDCCH, Msg4, RAR comprising RA preamble identifier(s) that matches a transmitted PREAMBLE_IN-DEX (e.g., an index of the preamble) and the like) before/prior to/and/within an expiry of the time window.

In another example, the wireless device may not transmit the first repetition of the preamble, for example, based on/due to an LBT failure. The wireless device may not transmit the second repetition of the preamble, for example, based on/due to an LBT failure. The number of LBT failures may be two, for example, based on the wireless device not transmitting the first preamble (e.g., based on/due to an LBT failure) and the wireless device not transmitting the second preamble (e.g., based on/due to an LBT failure). The number of LBT failure may be equal to (or not less than) the number/plurality of repetitions.

The wireless device may not increment (e.g., may suspend, may maintain, may keep the same, and the like) the first counter (e.g., preamble transmission counter), for example, based on the number of LBT failures being equal to (or not less than) the number/plurality of repetitions. The wireless device may not increment the first counter (e.g., preamble transmission counter), for example, based on not transmitting any/each repetition (e.g., the first repetition and the second repetitions), of the number/plurality of repetitions, of the preamble, e.g., due to/based on LBT failure(s). The wireless device may not increment the first counter (e.g., preamble transmission counter), for example, based on the number of LBT failures being equal to (or not less than) the number/plurality of repetitions and/or not receiving a response (e.g., RAR, MsgB, PDCCH, Msg4, RAR comprising RA preamble identifier(s) that matches a transmitted PREAMBLE_INDEX (e.g., an index of the preamble) and the like) before/prior to/and/within an expiry of the time window. The wireless device may not increment the first counter (e.g., preamble transmission counter), for example, based on not transmitting any/each repetition (e.g., the first repetition and the second repetitions), of the number/plurality of repetitions, of the preamble, e.g., due to/based on LBT failure(s) and/or not receiving a response (e.g., RAR, MsgB, PDCCH, Msg4, RAR comprising RA preamble identifier(s) that matches a transmitted PREAMBLE_INDEX (e.g., an index of the preamble) and the like) before/prior to/and/within an expiry of the time window.

Figures 20A, 20B:
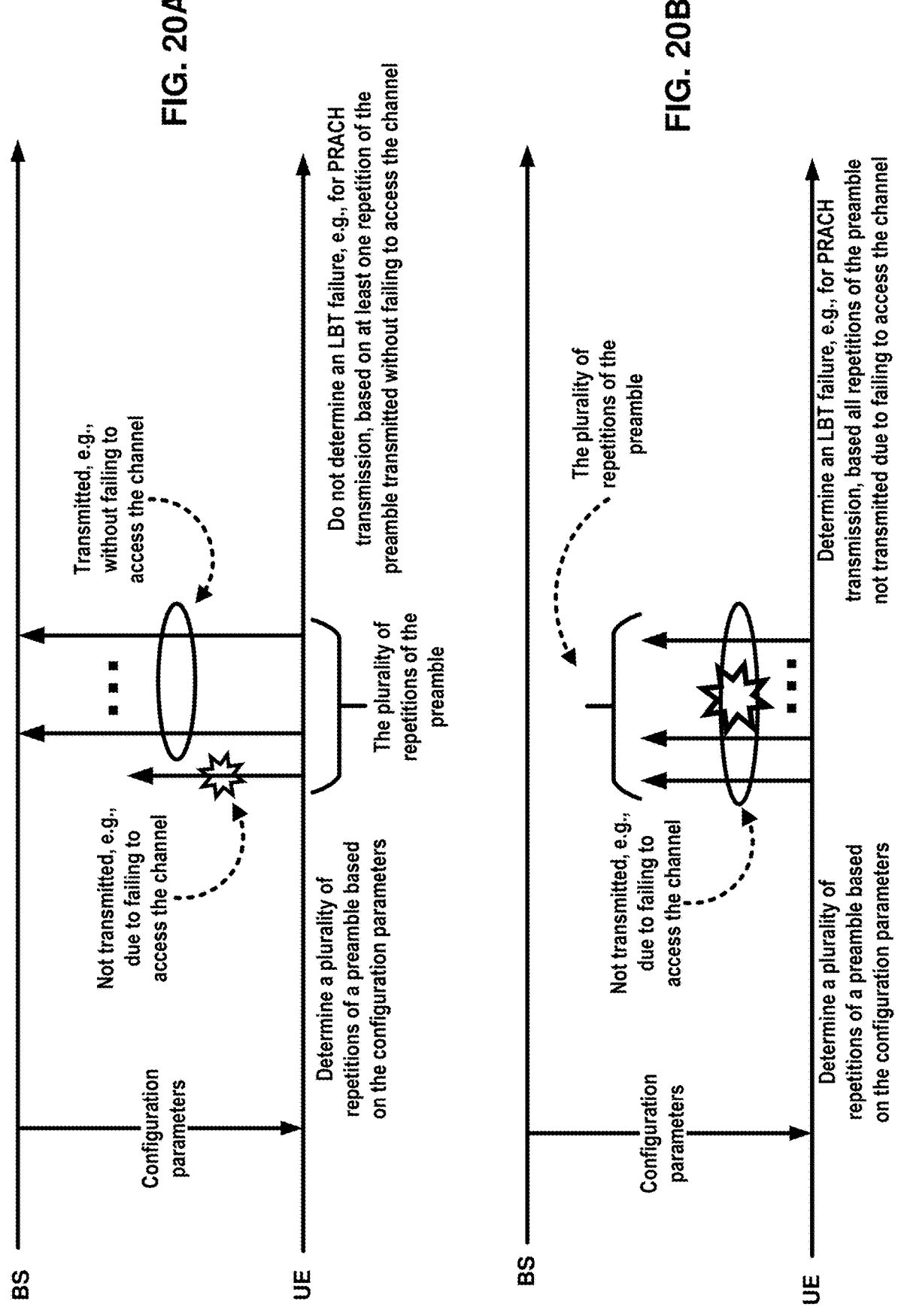
FIG. 20A and FIG. 20B show example timing diagrams as per aspect(s) of embodiment(s) of the present disclosure.

FIG. 20A and FIG. 20B show example timing diagrams as per aspect(s) of embodiment(s) of the present disclosure. According to the examples of FIG. 20A and FIG. 20B, the wireless device may receive one or more configuration parameters of/for a cell from a base station. The wireless device may determine a number/plurality of repetitions of a preamble for an RA procedure, for example, based on the one or more configuration parameters.

In the example of FIG. 20A, the wireless device may transmit at least X (where X may be 1, 2, half of the number/plurality, two thirds of the number/plurality, and the like) repetition(s), e.g., without failing to access a channel prior to/before/for transmitting the preamble. The wireless device may not transmit one or more repetitions (e.g., the number/plurality minus X), of the number/plurality of repetition, of the preamble, for example, based on failing to access the channel prior to/before/for transmitting the preamble. The wireless device may not determine LBT failure(s) (or determine no LBT failures), for example, based on transmitting at least X (where X may be 1, 2, half of the number/plurality, two thirds of the number/plurality, and the like) repetition(s), of the number/plurality of repetitions, of the preamble, for example, without failing to access a channel prior to/before/for transmitting the pre amble.

The wireless device determining no LBT failures (or not determining LBT failure(s) may comprise a physical layer (e.g., lower layer, Layer 1, and the like) of the wireless device not transmitting an LBT failure indication to a MAC entity/layer (e.g., upper layers) of the wireless device. The wireless device determining no LBT failures (or not determining LBT failure(s) may comprise a physical layer (e.g., lower layer, Layer 1, and the like) of the wireless device not notifying (e.g., indicating, transmitting, providing, and the like) the MAC entity/layer (e.g., upper layers) of the wireless device of/about a channel access failure.

In the example of FIG. 20B, the wireless device may not transmit any/each repetition, of the number/plurality of repetitions, of the preamble based on/due to failing to access the channel prior to transmitting the preamble. In an example, the wireless device may sense the channel to be busy prior to/before/for transmitting each/any/every repetition, of the number/plurality of repetitions, of the preamble. The wireless device may determine LBT failure(s), for example, based on not transmitting (e.g., not being able to transmit) any/each repetition, of the number/plurality of repetitions, of the preamble based on/due to failing to access the channel prior to transmitting the preamble.

The wireless device determining LBT failure(s) may comprise a physical layer (e.g., lower layer, Layer 1, and the like) of the wireless device transmitting an LBT failure indication to a MAC entity/layer (e.g., upper layers) of the wireless device. The wireless device determining LBT failure(s) may comprise a physical layer (e.g., lower layer, Layer 1, and the like) of the wireless device notifying (e.g., indicating, transmitting, providing, and the like) the MAC entity/layer (e.g., upper layers) of the wireless device of/about a channel access failure.

A wireless device may transmit a first preamble (e.g., random access preamble, Msg1, random access message 1, RACH transmission, RACH, PRACH, PRACH transmission, random access message, and the like) with a first number/plurality of repetitions. Transmitting the first preamble with the first number/plurality of repetitions may, for example, be the same as transmitting the first number/plurality of repetitions of the first preamble. Transmitting the first number/plurality of repetitions of the first preamble by the wireless device may comprise, for example, a medium access control (MAC) layer (e.g., upper layer) of the wireless device instructing a physical layer (e.g., lower layer) of the wireless device to transmit the first number/plurality of repetitions of the first preamble.

The wireless device may transmit the first preamble with the first number/plurality of repetitions, for example, to increase coverage (e.g., for coverage enhancement (CE), to increase coverage range, and the like). The wireless device may determine one or more first resources (e.g., PRACH resources, RACH resources, random access resources, MsgA resources, PUSCH resources, uplink resources, and the like) to transmit the first preamble, for example, based on a first reference signal (e.g., pathloss reference signal, synchronization signal block (SSB), physical broadcast channel (PBCH), channel state information reference signal (CSI-RS), cell-specific reference signal (CRS), and the like). The wireless device may select (e.g., determine, pick, choose, use, and the like) the first reference signal (RS), for example, based on a first radio link quality (e.g., reference signal received power (RSRP), reference signal received quality (RSRQ), signal to noise ratio (SNR), signal to interference plus noise ratio (SINR), block error rate (BLER), and the like) of the first RS. For example, the wireless device may select the first RS based on the first RS being associated with a highest radio link quality (e.g., highest RSRP) among a plurality of RSs transmitted by a base station.

A wireless device may set a counter (e.g., PREAMBLE_POWER_RAMPING_COUNTER, PREAMBLE_POWER_ RAMPING_COUNTER_CE, power ramping counter, preamble power ramping counter and the like) to a first value. The wireless device may use the counter (e.g., power ramping counter, a value of the counter, the first value, and the like) to determine a first transmit power (e.g., transmission power, transmitting power, output power, and the like) of the first preamble. For example, the first value may be one. The wireless device may determine the first transmit power to be a first power value. In an example, the first value may be two. The wireless device may determine the first transmit power to be a second power value. The second power value may be higher (e.g., greater, larger, more, and the like) than the first power value, for example, based on the second value being higher than the first value.

The base station may, for example, configure (e.g., enable, allow, permit, instruct, request, and the like) the wireless device to transmit the first preamble with the first number/plurality repetitions. The base station may, for example, configure the wireless device to transmit the first preamble with the first number/plurality of repetitions to increase (e.g., enhance) coverage (e.g., coverage area of the base station, CE) of the cell.

In response to transmitting the first preamble with the first number/plurality of repetitions, the wireless device may monitor (e.g., receive, expect to receive, detect, and the like) a control channel (e.g., PDCCH) for a response (e.g., random access response (RAR), fallbackRAR, MsgB, and the like). In an example, the wireless device may not receive a response from the base station after (or in response to) transmitting the first preamble with the first number/plurality of repetitions. The wireless device may retransmit a second preamble with a second number/plurality of repetitions. The wireless device may select a second RS to (re) transmit the second preamble. For example, the wireless device may determine one or more second resources to transmit the second preamble, for example, based on the second RS. The wireless device may transmit the second preamble with the second number/plurality of repetitions using a second transmit power.

In an example of existing technologies, the first number/plurality of repetitions of the first preamble may comprise a first repetition of the first preamble and a second repetition of the first preamble. The wireless device may transmit the first repetition of the first preamble, for example, without an LBT failure. The wireless device may not transmit the second repetition of the first preamble, for example, due to an LBT failure. According to the implementation of existing technologies, the wireless device may not increment (e.g., may suspend, may maintain, may keep the same, and the like) a power ramping counter based on not transmitting at least one repetition (e.g., the second repetition) of the first number/plurality of repetitions of the first preamble. Based on not incrementing the power ramping counter, the wireless device may transmit a second preamble with a same transmit/transmission power used for transmitting the first number/plurality of repetitions of the first preamble.

Transmitting the second preamble with the same transmit/transmission power used for transmitting the first preamble (for which the wireless device did not receive a corresponding RAR), as is performed in existing technologies, may result in the wireless device (e.g., yet again) not receiving an RAR corresponding to the second preamble. Transmitting the second preamble with the same transmit/transmission power used for a failed transmission (e.g., transmission of the first preamble and not receiving an RAR corresponding to the first preamble) may result in a second failed transmission (e.g., not receiving an RAR corresponding to the second preamble). As a result, latency may increase, power consumption at the wireless device may increase, battery life of the wireless device may reduce, and/or network resources may be underutilized/wasted.

In light of the existing technologies, there is a need to improve procedure(s) to increment/maintain the power ramping counter when transmitting preambles with a plurality of repetitions.

According to an example embodiment of the present disclosure, a wireless device may increment a power ramping counter based on a number of LBT failures for transmitting a number/plurality of repetitions of a first preamble being less than (or not equal to) the number/plurality of repetitions. For example, the wireless device may increment the power ramping counter based on transmitting at least one repetition of the number/plurality of repetitions of the first preamble without LBT failure(s) (e.g., without failing to access a channel prior to/before/for transmitting the preamble) The wireless device may not increment (e.g., may maintain, may retain, may suspend, may keep the same, and the like) the power ramping counter based on the number of LBT failures being equal to (or not less than) the plurality of repetitions.

Based on incrementing the power ramping counter in response to transmitting at least one repetition, of a plurality/number of repetitions, of a preamble without LBT failure, the wireless device may reduce (a probability of or a number of) possible retransmission(s) of a preamble. As a result, latency may be reduced, power consumption at the wireless device may be reduced, battery life of the wireless device may be increased, and/or wastage/underutilization of network resources may be reduced.

In an example embodiment, a wireless device may receive one or more configuration parameters of/for a cell from a base station. The wireless device may determine a number/ plurality of repetitions of a preamble for an RA procedure, for example, based on the one or more configuration parameters. In an example, the wireless device may determine the number/plurality of repetitions based on one or more radio link qualities of one or more RSs indicated in/by/via the one or more configuration parameters.

Figure 21:
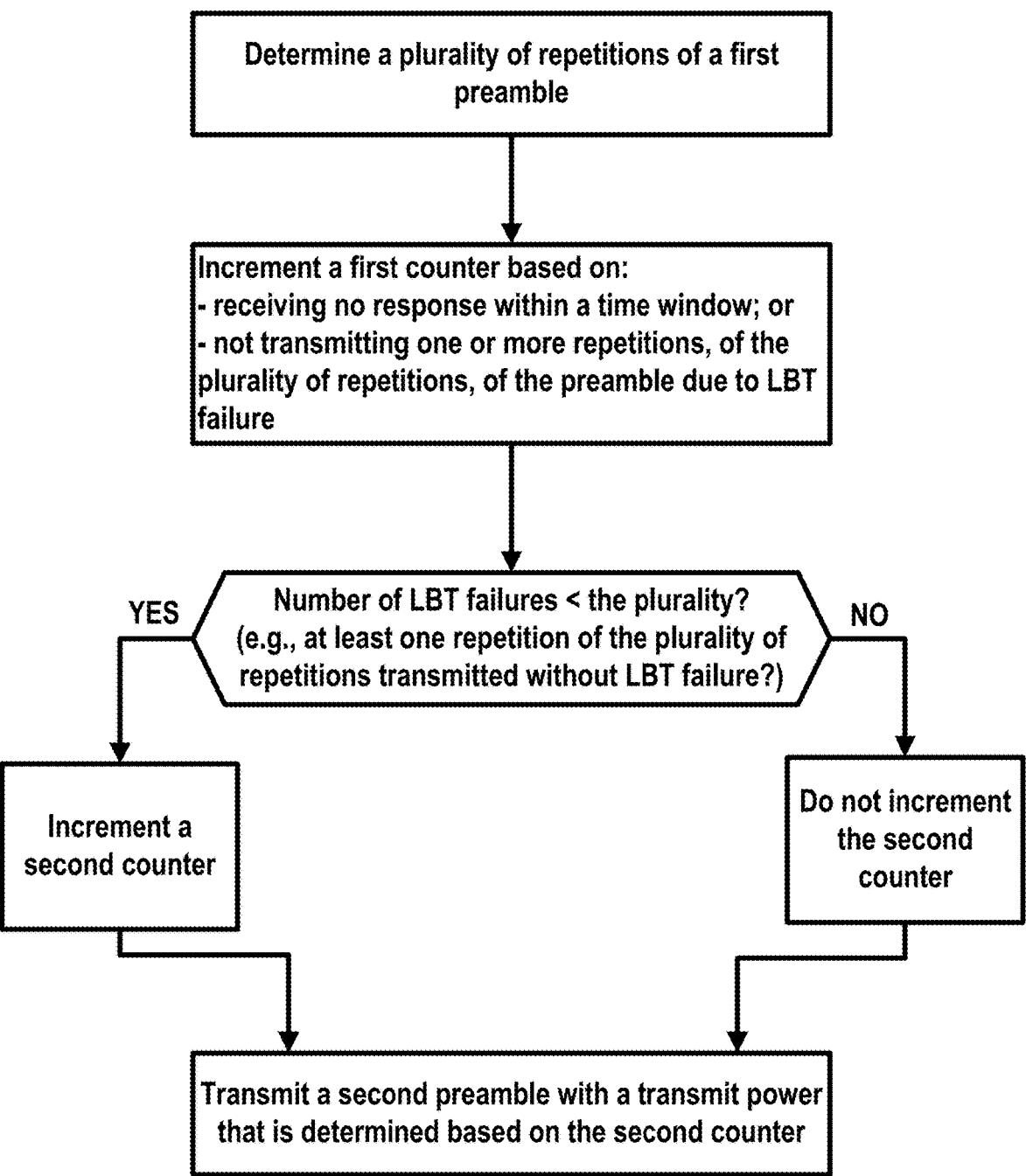
FIG. 21 shows an example flow diagram as per an aspect of an embodiment of the present disclosure.

FIG. 21 shows an example flow diagram as per an aspect of an embodiment of the present disclosure. According to the example of FIG. 21, the wireless device may determine a number/plurality of repetitions of a first preamble for an RA procedure. The wireless device may transmit (zero or one or more repetitions of) the number/plurality of repetitions of the first preamble for the RA procedure.

The wireless device may start a time window (e.g., ra-ResponseWindow, MsgB-ResponseWindow, and the like), for example, based on transmitting the first preamble. In an example, the wireless device may not receive a response (e.g., RAR, MsgB, PDCCH, Msg4, RAR comprising RA preamble identifiers that matches the transmitted PREAMBLE_INDEX (e.g., an index of the first preamble) and the like), for example, before/at/and/prior to expiry of the time window. The wireless device may increment a first counter (e.g., preamble transmission counter), for example, based on not receiving a response (e.g., RAR, MsgB, PDCCH, Msg4, RAR comprising RA preamble identifiers that matches the transmitted PREAMBLE_INDEX (e.g., an index of the first preamble) and the like) before/at/and/prior to expiry of the time window.

In an example, the wireless device may not transmit one or more repetitions of the number/plurality of repetitions of a first preamble based on/due to LBT failure(s) (e.g., due to failing to access a channel for/prior to transmitting the first preamble). The wireless device may increment a first counter (e.g., preamble transmission counter), for example, based on not transmitting the one or more repetitions of the number/plurality of repetitions of a first preamble based on/due to LBT failure(s) (e.g., due to failing to access a channel for/prior to transmitting the first preamble).

The number/plurality of repetitions of the first preamble may comprise, for example, a first repetition of the first preamble. The number/plurality of repetitions of the first preamble may comprise, for example, a second repetition of the first preamble.

In an example, the wireless device may transmit the first repetition of the first preamble without an LBT failure (e.g., without failing to access the channel prior to/for/before transmitting the first repetition of the first preamble, successfully accessing the channel prior to/for/before transmitting the first repetition of the first preamble, and the like). The wireless device may not transmit the second repetition of the first preamble, for example, based on/due to an LBT failure (e.g., failing to access the channel prior to/for/before transmitting the second repetition of the first preamble).

A number of LBT failures may be one, for example, based on the wireless device transmitting the first repetition of the first preamble without an LBT failure and not transmitting the second repetition of the first preamble based on/due to an LBT failure. The number/plurality of repetitions of the first preamble may be two. The number of LBT failures may be less (e.g., fewer, smaller, lower, and the like) than the number/plurality of repetitions of the first preamble.

The wireless device may increment a second counter (e.g., power ramping counter), for example, based on the number of LBT failures being less (e.g., fewer, smaller, lower, and the like) than the number/plurality of repetitions of the first preamble. The wireless device may increment the second counter (e.g., power ramping counter), for example, based on the number of LBT failures being greater (e.g., more, higher, larger, and the like) than one and less (e.g., fewer, smaller, lower, and the like) than the number/plurality of repetitions of the first preamble. The wireless device may increment the second counter (e.g., power ramping counter), for example, based on transmitting at least X (where X is 1, 2, half the number/plurality, two thirds the number/plurality and the like) repetitions, of the number/plurality of repetitions, of the first preamble without LBT failure(s). The wireless device may increment the second counter (e.g., power ramping counter), for example, based on transmitting at least X (where X is 1, 2, half the number/plurality, two thirds the number/plurality and the like) repetitions, of the number/plurality of repetitions, of the first preamble without LBT failure(s) and not transmitting one or more repetitions (e.g., the number/plurality minus X), of the plurality of repetitions, of the first preamble based on/due to LBT failure(s).

In an example, the wireless device may not transmit the first repetition of the first preamble due to/based on an LBT failure (e.g., based on failing to access the channel prior to/for/before transmitting the first repetition of the first preamble). The wireless device may not transmit the second repetition of the first preamble, for example, based on/due to an LBT failure (e.g., based on failing to access the channel prior to/for/before transmitting the second repetition of the first preamble).

The number of LBT failures may be two, for example, based on the wireless device not transmitting the first repetition of the first preamble based on/due to a first LBT failure and not transmitting the second repetition of the first preamble based on/due to a second LBT failure. The number/plurality of repetitions of the first preamble may be two. The number of LBT failures may be equal to (not less than) the number/plurality of repetitions of the first preamble.

The wireless device may not increment (e.g., may suspend, may retain, may maintain, may keep the same, and the like) the second counter (e.g., power ramping counter), for example, based on the number of LBT failures being equal to (not less than) the number/plurality of repetitions of the first preamble. The wireless device may not increment the second counter (e.g., power ramping counter), for example, based on the number of LBT failures being greater (e.g., more, higher, larger, and the like) than one and equal to (not less than) the number/plurality of repetitions of the first preamble. The wireless device may not increment the second counter (e.g., power ramping counter), for example, based on not transmitting (e.g., failing to transmit) at least X (where X is 1, 2, half the number/plurality, two thirds the number/plurality and the like) repetitions, of the number/plurality of repetitions, of the first preamble without LBT failure(s).

The wireless device may transmit a second preamble (e.g., a second number/plurality of repetitions of the second preamble). The wireless device may transmit the second preamble for the RA procedure. The wireless device may transmit the second preamble, for example, using/with a transmit/transmission power. The wireless device may determine the transmit/transmission power, for example, based on the second counter (e.g., power ramping counter, a value of the second counter, a value of the power ramping counter). In an example, the wireless device may increment the second counter. The wireless device may transmit the second preamble with a power that is higher than a power that was used to transmit the first number/plurality of repetitions of the first preamble, for example, based on incrementing the second counter. In another example, the wireless device may not increment (e.g., may maintain, may suspend, may retain, and the like) the second counter. The wireless device may transmit the second preamble with a power that is substantially equal to a power that was used to transmit the first number/plurality of repetitions of the first preamble, for example, based on not incrementing the second counter.

In some embodiments, suspending (e.g., not incrementing) a counter (e.g., the first counter, preamble transmission counter, the second counter, power ramping counter, and the like) may, for example, be (further) based on a value of a first counter (e.g., preamble transmission counter) being greater than one, receiving a listen-before-talk (LBT) failure indication (e.g., encountering an LBT failure condition, not transmitting a first preamble due to LBT failure, and the like) and/or changing a selected RS(s) (e.g., SSB, CSI-RS, and the like) (e.g., selecting a different RS(s) for the first PRACH/preamble transmission and the second PRACH/preamble transmission, the one or more first RSs being different from the one or more second RSs, and the like). In some embodiments, not suspending (e.g., incrementing) a counter (e.g., the first counter, preamble transmission counter, the second counter, power ramping counter, and the like) may, for example, be (further) based on a value of the first counter (e.g., preamble transmission counter) being greater than one, not receiving a listen-before-talk (LBT) failure indication (e.g., not encountering an LBT failure condition, transmitting a first preamble without an LBT failure, and the like) and/or not changing a selected RS (e.g., SSB, CSI-RS, and the like) (e.g., selecting the same RS for the first PRACH/preamble transmission and the second PRACH/preamble transmission, each RS of the one or more first RSs being the same as a respective RS of/from the one or more second RSs).

In some embodiments, the wireless device suspending a counter (e.g., the first counter, preamble transmission counter, the second counter, power ramping counter, and the like) may comprise a physical layer (e.g., Layer 1, lower layers, and the like) of the wireless device indicating (e.g., notifying, transmitting, and the like) to higher layers (e.g., upper layers, Layer 2, medium access control (MAC) layer, radio resource control (RRC) layer, and the like) to suspend the counter (e.g., the first counter, preamble transmission counter, the second counter, power ramping counter, and the like). The wireless device suspending the counter (e.g., the first counter, preamble transmission counter, the second counter, power ramping counter, and the like) may comprise upper layer(s) (e.g., higher layer(s), MAC layer, RRC layer, and the like) receiving notification of suspending the counter (e.g., the first counter, preamble transmission counter, the second counter, power ramping counter, and the like) from lower layers (e.g., Layer 1, physical layer, and the like).

In some embodiments, the wireless device not suspending (e.g., incrementing) a counter (e.g., the first counter, preamble transmission counter, the second counter, power ramping counter, and the like) may comprise a physical layer (e.g., Layer 1, lower layers, and the like) of the wireless device not indicating (e.g., notifying, transmitting, and the like) to higher layers (e.g., upper layers, Layer 2, medium access control (MAC) layer, radio resource control (RRC) layer, and the like) to suspend the counter (e.g., the first counter, preamble transmission counter, the second counter, power ramping counter, and the like). The wireless device not suspending the counter (e.g., the first counter, preamble transmission counter, the second counter, power ramping counter, and the like) may comprise upper layer(s) (e.g., higher layer(s), MAC layer, RRC layer, and the like) not receiving notification of suspending the counter (e.g., the first counter, preamble transmission counter, the second counter, power ramping counter, and the like).

In some embodiments, the wireless device suspending the counter (e.g., the first counter, preamble transmission counter, the second counter, power ramping counter, and the like) may comprise the wireless device determining to suspend the counter (e.g., the first counter, preamble transmission counter, the second counter, power ramping counter, and the like). In some embodiments, the wireless device determining to suspend the counter (e.g., the first counter, preamble transmission counter, the second counter, power ramping counter, and the like) may comprise the wireless device suspending the counter (e.g., the first counter, preamble transmission counter, the second counter, power ramping counter, and the like).

In some embodiments, the wireless device incrementing the counter (e.g., the first counter, preamble transmission counter, the second counter, power ramping counter, and the like) may comprise the wireless device determining to increment the counter (e.g., the first counter, preamble transmission counter, the second counter, power ramping counter, and the like).

In some embodiments, a second PRACH/preamble transmission (e.g., transmitting the second preamble, transmitting a number/plurality of repetitions of the second preamble) may be, for example, a retransmission of the first PRACH/preamble transmission. In some embodiments, the second PRACH/preamble transmission may be a retransmission of the first PRACH/preamble transmission, for example, based on value of the first counter (e.g., preamble transmission counter) being greater than one.

In some embodiments, the wireless device may determine LBT failure(s) for an RA procedure. The wireless device may transmit a number/plurality of repetitions of a preamble for the RA procedure with/using a transmit/transmission power associated with a maximum transmit/transmission power, for example, based on determining LBT failure(s) for the RA procedure. In an example, the transmit/transmission power may be the maximum transmit/transmission power. The transmit/transmission power may be, for example, PCmax, maximum received power, (a maximum value of a) PREAMBLE_RECEIVED_TARGET_POWER, zero pathloss, PREAMBLE_POWER_RAMPING_STEP, PCMAX, $P_{CMAX,f,c}$ of a signaled carrier, $P_{CMAX,f,c}$ of an SUL carrier, $P_{CMAX,f,c}$ of an NUL carrier, and/or the like.

In any/some of the example embodiments of the present disclosure, the wireless device may determine a plurality of spatial domain transmission filters (SDTFs) for an RA procedure. The plurality of SDTFs may comprise a first SDTF and a second SDTF. The wireless device may determine a number/plurality of repetitions of a preamble for the RA procedure. The wireless device may transmit the number/plurality of repetitions of the preamble using/based on/with/via/on/by applying the plurality of SDTFs. The number/plurality of repetitions may comprise a first number/plurality of repetitions and a second number/plurality of repetitions. For example, a sum of the first number/plurality of repetitions and the second number/plurality of repetitions may be equal (or substantially equal) to the number/plurality of repetitions. The wireless device may, for example, transmit the first number/plurality of repetitions of the preamble using/based on/with/via/on/by applying the first SDTF. The wireless device may transmit the second number/plurality of repetitions of the preamble, for example, using/based on/with/via/on/by applying the second SDTF.

In any/some of the example embodiments of the present disclosure, a first PRACH transmission may be a first preamble transmission. A second PRACH transmission may be, for example, a second preamble transmission. The first PRACH transmission may be, for example, the same as transmitting a first number/plurality of repetitions of a first preamble. The second PRACH transmission may be, for example, the same as transmitting a second number/plurality of repetitions of a second preamble.

In this specification, a preamble may, in some embodiments, refer to (e.g., mean, comprise, be, and the like) an uplink signal/message (e.g., PRACH transmission/message, RACH transmission/message, Msg1, Msg3, Msg5, Msg4 HARQ-ACK, PUCCH transmission/message, PUSCH transmission/message, RA preamble, UCI, MAC-CE, and the like).

In this specification, an RA procedure may be performed for a purpose (e.g., raPurpose). Based on the purpose of the RA procedure, a wireless device may determine (e.g., set, use, configure, and the like) a parameter (e.g., raPurpose) to a value corresponding to the purpose. In an example, the purpose may be initial access for the wireless device from RRC_IDLE/RRC_INACTIVE mode/state. In an example, the purpose may be RRC connection re-establishment. In an example, the purpose may be downlink or uplink data arrival during RRC_CONNECTED and/or RRC_INACTIVE when the uplink synchronization status is "non-synchronized." In an example, the purpose may be uplink data arrival when there are no PUCCH resources for SR available to the wireless device. In an example, the purpose may be SR failure. In an example, the purpose may be request by a RRC layer of the wireless device upon synchronous reconfiguration (e.g., handover). In an example, the purpose may be RRC connection resume procedure from RRC_INACTIVE/ RRC_IDLE state/mode. In an example, the purpose may be to establish time alignment for a secondary timing advance group. In an example, the purpose may be to request for other system information. In an example, the purpose may be for beam failure recovery. In an example, the purpose may be due to consistent uplink listen before talk (LBT) failure on a SpCell. In an example, the purpose may be for SDT in RRC_INACTIVE/RRC_IDLE mode/state. In an example, the purpose may be for positioning during RRC_ CONNECTED state requiring the RA procedure, e.g., when timing advance is needed for positioning.

In an example, the RA procedure may be a 4-step (e.g., type-1) RA procedure. In an example, the RA procedure may be a 2-ste (e.g., type-2) RA procedure. In an example, the RA procedure may be a contention based RA (CBRA) procedure. The wireless device may select/transmit a preamble (e.g., the first preamble, the second preamble, and the like) from a set of preambles dedicated to CBRA, for example, based on the RA procedure being a CBRA.

In an example, the RA procedure may be a contention free RA (CFRA) procedure. The wireless device may select/ transmit a preamble (e.g., the first preamble, the second preamble, and the like) from a set of preambles dedicated to CFRA, for example, based on the RA procedure being a CFRA.

In an example, incrementing the second counter (e.g., power ramping counter) may be the same as increasing a transmit power. In an example, the wireless device may set the second counter (e.g., power ramping counter) to a first value. The wireless device may determine a first transmit/ transmission power based on the second counter (e.g., the first value of the second counter). The wireless device may increment the second counter (e.g., power ramping counter). A value of the second counter after the wireless device incremented the second counter may be a second value. The second value may be higher than the first value. The wireless device may determine a second transmit/transmission power based on the second counter (e.g., the second value of the second counter). The second transmit/transmission power may be higher (e.g., greater, stronger, more, larger, and the like) than the first transmit/transmission power, for example, based on the second value being higher than the first value.

In an example, the wireless device may determine the second transmit/transmission power that is higher than the first transmit/transmission power without using the second counter (e.g., power ramping counter). Increasing a transmit/ transmission power from the first transmit/transmission power to the second transmit/transmission power using the second counter (e.g., power ramping counter) may be one of several methods of increasing the transmit power. In an example, the wireless device may increase the transmit/ transmission power without incrementing the second counter (e.g., power ramping counter), e.g., by incrementing (e.g., increasing) a step value (e.g., PREAMBLE_POWER_ RAMPING_STEP, DELTA_PREAMBLE, POWER_OFFSET_2STEP_RA, and the like). In another example, the wireless device may increase the transmit/ transmission power without incrementing the second counter (e.g., power ramping counter), e.g., based on increasing a target received power (e.g., preambleReceivedTargetPower, PREAMBLE_RECEIVED_TARGET_POWER, and the like). In light of the different methods (e.g., techniques, embodiments, and the like) to increase the transmit/transmission power, incrementing the second counter (e.g., power ramping counter) may be the same (e.g., may comprise) as increasing (e.g., changing) the transmit/transmission power from the first transmit/transmission power to the second transmit/transmission power, for example, based on incrementing (e.g., increasing) the step value. Incrementing the second counter (e.g., power ramping counter) may be the same (e.g., may comprise) as increasing (e.g., changing) the transmit/transmission power from the first transmit/transmission power to the second transmit/transmission power, for example, based on increasing the target received power.

In this specification, a number/plurality of repetitions and a (associated) level (or a level and an associated number/ plurality of repetitions, e.g., coverage enhancement (CE) level, CE mode, and the like) may be used interchangeably (or may mean the same, or indicate the same). For example, a first level may be associated with a first number/plurality of repetitions and a second level may be associated with a second number/plurality of repetitions. The wireless device may determine, for example, a level (of the wireless device) to be the first level. Determining the level to be the first level may, for example, be the same as determining the number/ plurality of repetitions to be the first number of repetitions. The wireless device may determine, for example, a number/ plurality of repetitions to be the second number/plurality of repetitions. Determining the number/plurality of repetitions to be the second number/plurality of repetitions may, for example, be the same as determining a level to be the second level. In an example, the first number/plurality of repetitions and the second number/plurality of repetitions may be the same. The first level and the second level may be the same, for example, based on the first number/plurality of repetitions and the second number/plurality of repetitions being the same. In an example, the wireless device may determine that the first number/plurality of repetitions and the second number/plurality of repetitions are the same. The wireless device may determine that the first level and the second level are the same, for example, based on the first number/ plurality of repetitions and the second number/plurality of repetitions being the same. In an example, the first number/plurality of repetitions may be associated with a first value. The first level may be associated with the first value, for example, based on the first number/plurality of repetitions being associated with the first value.

In an example, a first number/plurality of repetitions may be associated with a first level. The wireless device may transmit the first number/plurality of repetitions of a preamble, for example, based on determining a level of the wireless device to be the first level. In an example, a second number/plurality of repetitions may be associated with a second level. The wireless device may transmit the second number/plurality of repetitions of a preamble, for example, based on determining the level of the wireless device to be the second level.

In an example, transmitting a number/plurality of repetitions of a preamble may comprise transmitting the (same) preamble the number/plurality of times. In an example, the number of repetitions may be one. The wireless device may transmit the preamble once, for example, based on the number of repetitions being one. In an example, the number of repetitions being one may be considered to be preamble without repetitions. In another example, the number/plurality of repetitions may be two repetitions. The wireless device may transmit the preamble. The wireless device may subsequently transmit the same preamble again for a total of two times, for example, based on the number/plurality of repetitions being two.

In an example, the number/plurality of repetitions may be higher than one. The wireless device may transmit a plurality of repetitions of the preamble. Transmitting a plurality of repetitions of the preamble (or transmitting a number of repetitions of the preamble, wherein the number of repetitions is higher than one) may be referred to, for example, as multiple preamble transmission, multiple Msg1 transmission, multiple PRACH transmission, multiple RACH transmission, multi-Msg1 repetition, multi-Msg1 transmission, random access message repetition, multiple random access message transmission, and the like. Transmitting one repetition of the preamble may also be referred to as transmitting the preamble with no repetitions (or without repetitions).

In an example, an nth preamble, $x_{u,v}(n)$, may be generated by the wireless device according to from which the frequency-domain representation is generated according to $$x_{u,v}(n) = x_u((n + C_v)\text{mod}L_{RA});$$

$$x_u(i) = e^{-j\frac{\pi u i(i+1)}{L_{RA}}}, i = 0, 1, \ldots L_{RA} - 1;$$

$$y_{u,v}(n) = \sum_{m=0}^{L_{RA}-1} x_{u,v}(m) \cdot e^{-j\frac{2\pi mn}{L_{RA}}},$$

where $L_{RA}$=839, $L_{RA}$=139, $L_{RA}$=1151, or $L_{RA}$=571 depending on the PRACH preamble format. There may be, for example, 64 preambles defined in each time-frequency PRACH occasion, enumerated in increasing order of first increasing cyclic shift Cy of a logical root sequence, and then in increasing order of the logical root sequence index, starting with the index obtained from the higher-layer parameter prach-RootSequenceIndex or rootSequenceIndex-BFR or by msgA-PRACH-RootSequenceIndex if configured and a type-2 random-access procedure is initiated. Additional preamble sequences, in case 64 preambles may not be generated from a single root Zadoff-Chu sequence, may be obtained from the root sequences with the consecutive logical indexes until all the 64 sequences are found. The logical root sequence order may be cyclic; the logical index 0 may be consecutive to $L_{RA}$−2. The sequence number u may be obtained from a logical root sequence index according to preconfigured table(s).

In an example, the wireless device may transmit a number/plurality of repetitions of a preamble. The number/plurality of repetitions may be higher than one. Each repetition of the preamble of the number/plurality of repetitions of the preamble may comprise a second number of repetitions of a sequence. In an example, the sequence may be a Zadoff-Chu sequence, logical root sequence, root sequence, and the like. The number/plurality of repetitions of the preamble may comprise transmitting the number/plurality of repetitions of a second number of repetitions of the sequence. For example, the number/plurality of repetitions may be two. The second number of repetitions may be four. Transmitting the number/plurality of repetitions of the preamble may comprise transmitting eight repetitions of the sequence. The number/plurality of repetitions of the preamble and the second number of repetitions of the sequence may, for example, be the same. The number/plurality of repetitions of the preamble and the second number of repetitions of the sequence may, for example, be different. In an example, the number/plurality of repetitions of the preamble may be one. The second number of repetitions of the sequence may be four. Transmitting the number/plurality of repetitions (e.g., one, no repetitions, and the like) of the preamble may comprise transmitting the sequence four times, for example, based on the second number of repetitions being four.

In an example, the wireless device may determine a number/plurality of repetitions of a preamble. Determining a number/plurality of repetitions of a preamble may comprise determining to transmit the number/plurality of repetitions of the preamble. In an example, the wireless device may determine one or more RA resources (e.g., based on a determined RS). Determining the one or more RA resources may comprise determining to transmit an uplink signal (e.g., PRACH signal, RACH signal, preamble, Msg1, Msg3, PUSCH, PUCCH, and the like) over/using/via the one or more RA resources. In an example, the wireless device may determine a preamble based on an RS. Determining the preamble may comprise determining to transmit the preamble.

Throughout this specification, determining an RS (e.g., for an RA procedure) may comprise selecting the RS (e.g., for the RA procedure). Determining an RS may comprise choosing the RS. Determining the RS may comprise picking the RS. Determining the RS may comprise using the RS.

In this specification, determining an RS may comprise determining an RS for an RA procedure. Based on determining an RS for the RA procedure, a wireless device may determine RA resource(s) based on the RS. The wireless device may transmit one or more repetitions of a preamble via/using the RA resource(s). The wireless device may determine a number of repetitions of a preamble based on a radio link quality of the RS. The wireless device may transmit the number of repetitions of the preamble, for the random access procedure (of/for/in/via a cell), via/over/using the RA resource(s), for example, based on determining the RS.

In this specification, determining an RS may comprise determining one or more (RA) resources, based on the RS, for transmitting an uplink signal (e.g., preamble, PUSCH, PUCCH, SRS, and the like), e.g., for a RA procedure. Determining a number of repetitions may comprise transmitting the number of repetitions of the uplink signal via/over/using the one or more RA resources.

In this specification, the term "SDTF" or "spatial domain transmission filter" may comprise/be/mean a TX beam. An SDTF may comprise/be an SDTF of a TX beam. An SDTF may comprise/be/mean spatial domain transmit filter, spatial domain transmitting filter, beam, TX beam, precoder, transmission configuration indicator/indication (TCI) state, precoding matrix, beamforming matrix, beamformer, and/or the like.

In some embodiments, suspending a counter (e.g., power ramping counter, preamble transmission counter, and the like) may comprise maintaining (e.g., retaining, keeping the same, sustaining, not changing, and the like) a value of the counter. Suspending the counter may comprise not incrementing (e.g., not increasing, not adding, not decrementing, not subtracting, and the like) a value of the counter.

In some embodiments, incrementing a counter (e.g., power ramping counter, preamble transmission counter) may comprise not suspending (e.g., not retaining, not keeping the same, changing, not sustaining, and the like) the counter. Incrementing the counter (e.g., power ramping counter) may comprise not decrementing the counter.

In this specification, a power ramping counter may be the same as a PREAMBLE_POWER_RAMPING_COUNTER. A preamble transmission counter may be the same as a PREAMBLE_TRANSMISSION_COUNTER.

In some embodiments, MAC entity of the wireless device may indicate/comprise/be/mean the wireless device. The terms "MAC entity of the wireless device", "wireless device", and "MAC entity" may be used interchangeably.

In some embodiments, a number of LBT failures may comprise/be/indicate/mean a number of LBT failure indications. For example, the number of LBT failures may comprise/be/indicate/mean the number of LBT failure indication transmitted (e.g., sent, indicated, notifying, instructed, and the like) by lower layer(s) (e.g., Layer 1, physical layer, and the like) of the wireless device to a MAC entity/layer of the wireless device.

In some embodiments, LBT failure(s) may comprise/mean/indicate/be failure to access a channel (e.g., prior to an intended (UL) transmission). In an example, a physical layer of the wireless device failing to access the channel prior to an intended UL transmission may comprise/mean/indicate/be a MAC layer/entity of the wireless device receiving an LBT failure indication.

In some embodiments, consistent LBT failure(s) may indicate/mean/be/comprise consistent UL LBT failure(s).

In some embodiments, a plurality of repetitions of a preamble may comprise a number of repetitions of the preamble, wherein the number is greater than one. Transmitting a plurality of repetitions of a preamble may be/comprise transmitting a number of repetitions of the preamble, wherein the number is greater than one.
<Transmitting a Plurality of Repetitions is Same as Transmitting a Number of Repetitions Wherein the Number is Greater than One>

In some embodiments, transmitting a preamble may comprise/be/mean/indicate a PRACH transmission. For example, a wireless device transmitting a preamble may comprise/be/mean/indicate the wireless device performing a PRACH transmission. In some embodiments, transmitting a preamble may comprise/be/mean/indicate a PRACH transmission. For example, a wireless device transmitting a number/plurality of repetitions preamble may comprise/be/mean/indicate the wireless device performing a PRACH transmission.

In some embodiments, the X repetitions of the preamble may be indicated by the one or more configuration parameters (e.g., RRC configuration parameters, system information parameters, and the like). For example, the one or more configuration parameters may comprise a value of X.

In some embodiments, there may be a single (e.g., only one, not more than one, not two or more, and the like) RA procedure ongoing in the wireless device (or a MAC entity of the wireless device), e.g., at any point in time. The wireless device may transmit the first preamble for the RA procedure. The wireless device may transmit the second preamble for the RA procedure. The wireless device may transmit a (first) number/plurality of repetitions of the first preamble for the RA procedure. The wireless device may transmit a (second) number/plurality of repetitions of the second preamble for the RA procedure. The wireless device may perform the first PRACH transmission for the RA procedure. The wireless device may perform the second PRACH transmission for the RA procedure.

In an example, the second PRACH transmission may be a retransmission of the first PRACH transmission. The second PRACH transmission may be a retransmission of the first PRACH transmission for the RA procedure. The wireless device may transmit the second preamble, for example, to retransmit the first preamble.

In some embodiments, determining a value of a counter may comprise/mean/indicate/be incrementing the counter. In an example, determining a value of a counter may comprise/mean/indicate/be suspending (e.g., not incrementing, maintaining, retaining, sustaining, keeping the same and the like) the counter.

An example method comprising: receiving, by a wireless device, one or more configuration parameters comprising one or more consistent listen before talk (LBT) failure detection parameters; transmitting, for a random access (RA) procedure, a plurality of repetitions of a first preamble; determining a value of a preamble transmission counter based on: whether a number of LBT failures is less than the plurality of repetitions of the first preamble; and the one or more configuration parameters comprising the one or more consistent LBT failure detection parameters; and transmitting, for the RA procedure, a second preamble.

The above example method, wherein the one or more configuration parameters are one or more broadcast configuration parameters.

One or more of the above example methods, wherein the one or more consistent LBT failure detection parameters are one or more LBT failure recovery configuration parameters.

One or more of the above example methods, wherein the one or more consistent LBT failure detection parameters are used for detection of consistent uplink LBT failures for operation with shared spectrum channel access.

One or more of the above example methods, wherein the one or more consistent LBT failure detection parameters comprise a timer for consistent uplink LBT failure detection.

One or more of the above example methods, wherein the timer is lbt-FailureDetection Timer.

One or more of the above example methods, wherein the one or more consistent LBT failure detection parameters comprise a failure instance value to determine after how many LBT failure indications received from a physical layer the wireless device triggers uplink LBT failure recovery.

One or more of the above example methods, wherein the failure instance value is/bt-FailureInstanceMaxCount.

One or more of the above example methods, further comprising an LBT counter.

One or more of the above example methods, wherein the wireless device triggers a consistent LBT failure based on the LBT counter being greater than (or equal to) a failure instance value.

One or more of the above example methods, wherein the wireless device does not trigger a consistent LBT failure based on the LBT counter being less than a failure instance value.

One or more of the above example methods, wherein the first preamble is a first RA preamble.

One or more of the above example methods, wherein the second preamble is a second RA preamble.

One or more of the above example methods, wherein the first preamble is associated with a first preamble index.

One or more of the above example methods, wherein each repetition of the plurality of repetitions is associated with the first preamble index.

One or more of the above example methods, wherein the first preamble is associated with a first RA-radio network temporary identifier (RA-RNTI).

One or more of the above example methods, wherein each repetition of the plurality of repetitions of the first preamble is associated with the first RA-RNTI.

One or more of the above example methods, wherein each repetition of the plurality of repetitions of the first preamble is not associated with the first RA-RNTI.

One or more of the above example methods, wherein the second preamble is associated with a second preamble index.

One or more of the above example methods, wherein the RA procedure one of: 2-step RA procedure; or 4-step RA procedure.

One or more of the above example methods, wherein the RA procedure is one of: contention-based RA procedure; or contention free RA procedure.

One or more of the above example methods, wherein the RA procedure is for a small data transmission.

One or more of the above example methods, wherein the transmitting is in a non-terrestrial network (NTN).

One or more of the above example methods, wherein the first value is one.

One or more of the above example methods, wherein each repetition of the plurality of repetitions of the first preamble comprises a plurality of repetitions of a physical random access channel sequence.

One or more of the above example methods, wherein the one or more configuration parameters indicate a plurality of reference signals (RSs).

One or more of the above example methods, further comprising selecting an RS of the plurality of RSs.

One or more of the above example methods, further comprising determining the plurality of repetitions of the first preamble based on a radio link quality of the RS.

One or more of the above example methods, wherein the number of LBT failures is substantially equal to zero.

One or more of the above example methods, wherein the determining further comprises not incrementing the preamble transmission counter based on: the number of LBT failures being substantially equal to zero; and the one or more configuration parameters comprising the one or more consistent LBT failure detection parameters.

One or more of the above example methods, further comprising selecting one or more RA resources for transmitting a second preamble for the RA procedure.

One or more of the above example methods, wherein the number of LBT failures is less than the plurality of repetitions of the first preamble.

One or more of the above example methods, wherein the determining further comprises not incrementing the preamble transmission counter based on: the number of LBT failures being less than the plurality of repetitions of the first preamble; and the one or more configuration parameters comprising the one or more consistent LBT failure detection parameters.

One or more of the above example methods, further comprising selecting one or more RA resources for transmitting a second preamble for the RA procedure.

One or more of the above example methods, wherein the number of LBT failures is equal to the plurality of repetitions of the first preamble.

One or more of the above example methods, wherein the determining further comprises not incrementing the preamble transmission counter based on: the number of LBT failures being equal to the plurality of repetitions of the first preamble; and the one or more configuration parameters comprising the one or more consistent LBT failure detection parameters;

One or more of the above example methods, further comprising selecting one or more RA resources for transmitting a second preamble for the RA procedure.

One or more of the above example methods, wherein one or more second configuration parameters does not comprise the one or more consistent LBT failure detection parameters.

One or more of the above example methods, wherein the number of LBT failures is substantially equal to zero.

One or more of the above example methods, wherein the determining further comprises not incrementing the preamble transmission counter based on: the number of LBT failures being substantially equal to zero; and the one or more second configuration parameters not comprising the one or more consistent LBT failure detection parameters.

One or more of the above example methods, wherein the number of LBT failures is less than the plurality of repetitions of the first preamble.

One or more of the above example methods, wherein the determining further comprises incrementing the preamble transmission counter based on: the number of LBT failures being less than the plurality of repetitions of the first preamble; and the one or more second configuration parameters not comprising the one or more consistent LBT failure detection parameters.

One or more of the above example methods, wherein the determining further comprises not incrementing the preamble transmission counter based on: the number of LBT failures being less than the plurality of repetitions of the first preamble; and the one or more second configuration parameters not comprising the one or more consistent LBT failure detection parameters.

One or more of the above example methods, wherein the number of LBT failures is equal to the plurality of repetitions of the first preamble.

One or more of the above example methods, wherein the determining further comprises incrementing the preamble transmission counter based on: the number of LBT failures being less than the plurality of repetitions of the first preamble; and the one or more second configuration parameters not comprising the one or more consistent LBT failure detection parameters.

One or more of the above example methods, further comprising transmitting a second plurality of repetitions of the second preamble.

Clause 1. A method comprising: determining, by a wireless device, a first plurality of repetitions of a first preamble for a random-access procedure; suspending, by the wireless device, a power-ramping counter based on not transmitting each repetition of the first plurality of repetitions of the first preamble; and transmitting, by the wireless device, a second preamble with a transmit power that is determined based on the power-ramping counter for the random-access procedure.

Clause 2. A method comprising: suspending, by a wireless device, a power-ramping counter of a random-access procedure based on not transmitting each repetition of a first plurality of repetitions of a first preamble of the random-access procedure.

Clause 3. The method of clause 2, further comprising determining, the first plurality of repetitions of the first preamble for the random-access procedure.

Clause 4. The method of clause 2, further comprising transmitting, a second preamble with a transmit power that is determined based on the power-ramping counter for the random-access procedure.

Clause 5. The method of clause 2, further comprising transmitting a second preamble with a transmit power based on the power-ramping counter for the random-access procedure.

Clause 6. The method of clause 5, further comprising determining a value of the power-ramping counter, wherein the transmit power is based on the value of the power-ramping counter.

Clause 7. The method of any one of clauses 5 and 6, further comprising suspending the power-ramping counter, wherein the transmit power is based on a suspended power-ramping counter.

Clause 8. The method of any one of clauses 5 to 7, wherein the second preamble is transmitted on a non-terrestrial network.

Clause 9. The method of any one of clauses 2 to 8, wherein not transmitting each repetition of the first plurality of repetitions is based on failing to transmit each repetition of the first plurality of repetitions of the first preamble.

Clause 10. The method of any one of clauses 2 to 9, further comprising receiving, by the wireless device, one or more configuration parameters.

Clause 11. The method of clause 10, wherein the one or more configuration parameters comprise one or more broadcast configuration parameters.

Clause 12. The method of clause 10, wherein the one or more configuration parameters indicate one or more reference signals.

Clause 13. The method of clause 12, further comprising determining the first plurality of repetitions based on a radio link quality of a reference signal of the one or more reference signals.

Clause 14. The method of any one of clauses 2 to 13, further comprising incrementing a preamble transmission counter.

Clause 15. The method of clause 14, wherein incrementing the preamble transmission counter is based on the wireless device not receiving a random-access response corresponding to the first preamble.

Clause 16. The method of clause 15, wherein incrementing the preamble transmission counter is further based on not receiving the random-access response corresponding to the first preamble within a time window.

Clause 17. The method of clause 16, wherein the time window is a random-access response window.

Clause 18. The method of any one of clauses 2 to 17, wherein the random-access procedure is one of: a two-step random-access procedure; or a four-step random-access procedure.

Clause 19. The method of any one of clauses 2 to 18, wherein the random-access procedure is one of: a contention based random-access procedure; or a contention free random-access procedure.

Clause 20. The method of any one of clauses 3 to 19, further comprising incrementing the power-ramping counter based on transmitting at least one repetition of a second plurality of repetitions of a third preamble of the random-access procedure.

Clause 21. The method of clause 20, further comprising determining the second plurality of repetitions of the third preamble of the random-access procedure.

Clause 22. The method of clause 20, further comprising transmitting a fourth preamble with a transmit power based on the power-ramping counter.

Clause 23. The method of clause 22, wherein the transmit power of the fourth preamble is based on an incrementing the power-ramping counter.

Clause 24. A method comprising: receiving, by a wireless device from a base station, one or more configuration parameters comprising one or more listen before talk failure detection parameters; transmitting, by a wireless device, a plurality of repetitions of a first preamble for a random-access procedure; determining, by the wireless device, a value of a preamble transmission counter based on: whether a number of listen before talk failure is less than the plurality of repetitions of the first preamble; and the one or more configuration parameters comprising the one or more listen before talk failure detection parameters; and transmitting, by the wireless device, a second preamble for the random-access procedure.

Clause 25. A method comprising: receiving, by a wireless device from a base station, configuration parameters comprising one or more listen before talk failure detection parameters; transmitting, by the wireless device, a plurality of repetitions of a first preamble for a random-access procedure; setting a preamble transmission counter to a first value; maintaining the first value of the preamble transmission counter based on: determining, by the wireless device, a listen before talk failure for each repetition of the plurality of repetitions of the first preamble; and the configuration parameters; and transmitting, by the wireless device, a second preamble for the random-access procedure.

Clause 26. A method comprising: receiving, by a wireless device, one or more configuration parameters indicating a number of repetitions of a first preamble; transmitting, by the wireless device, the number of repetitions of the first preamble for a first random-access procedure; determining, by the wireless device, a listen before talk failure for each repetition of the number of repetitions of the first preamble; maintaining, by the wireless device, a counter for determining a number of preamble transmissions, based on: determining of the listen before talk failure for each repetition of the number of repetitions of the first preamble; and the one or more configuration parameters comprising a configuration for detection of listen before talk failures; transmitting, for a second random access procedure, a preamble with the number of repetitions.

Clause 27. The method of clause 26, wherein the number of repetitions of the first preamble is greater than one.

Clause 28. The method of clause 26, wherein the number of repetitions of the first preamble are on non-consecutive time durations.

Clause 29. A method comprising: receiving, by a wireless device, one or more configuration parameters comprising one or more listen before talk failure detection parameters; transmitting, by the wireless device, a plurality of repetitions of a first preamble for a random-access procedure; determining, by the wireless device, a value of a preamble transmission counter based on at least one of: not receiving a random-access response; expiry of a random-access response window; whether a number of listen before talk failures is less than the plurality of repetitions of the first preamble; the one or more configuration parameters; and transmitting, by the wireless device, the plurality of repetitions of the first preamble; and transmitting, by the wireless device, a second preamble for the random-access procedure.

Clause 31. A method comprising: receiving, by a wireless device, one or more configuration parameters comprising one or more listen before talk failure detection parameters; determining, by the wireless device, a plurality of repetitions of a first preamble for a random-access procedure; determining, by the wireless device, a value of a preamble transmission counter based on: whether a number of listen before talk failures to access a channel for transmitting the first preamble is less than the plurality of repetitions of the first preamble; and the one or more configuration parameters comprising the one or more listen before talk failure detection parameters; and transmitting, by the wireless device, a second preamble based on the value of the preamble transmission counter for the random-access procedure.

Clause 32. The method of any one of clauses 24 to 31, wherein the one or more configuration parameters are broadcast configuration parameters.

Clause 33. The method of any one of clauses 24 to 32, wherein the one or more listen before talk failure detection parameters are listen before talk failure recovery configuration parameters.

Clause 34. The method of any one of clauses 24 to 33, wherein the one or more listen before talk failure detection parameters comprise a timer for uplink listen before talk failure detection.

Clause 35. The method of any one of clauses 24 to 34, wherein the one or more listen before talk failure detection parameters comprise a failure instance value to determine after how many listen before talk failure indications received from a physical layer the wireless device triggers uplink listen before talk failure recovery.

Clause 36. The method of any one of clauses 24 to 35, further comprising a listen before talk counter.

Clause 37. The method of clause 36, wherein the wireless device triggers a listen before talk failure based on the listen before talk counter being greater than or equal to a failure instance value.

Clause 38. The method of clause 36, wherein the wireless device does not trigger a listen before talk failure based on the listen before talk counter being less than a failure instance value.

Clause 39. The method of any one of clauses 24 to 38, wherein the first preamble is associated with a first random access-radio network temporary identifier (RA-RNTI).

Clause 40. The method of clause 39, wherein each repetition of the plurality of repetitions of the first preamble is associated with the first RA-RNTI.

Clause 41. The method of clause 39, wherein each repetition of the plurality of repetitions of the first preamble is not associated with the first RA-RNTI.

Clause 42. The method of any one of clauses 24 to 41, wherein the one or more configuration parameters indicate a plurality of reference signals.

Clause 43. The method of any one of clauses 24 to 42, wherein determining further comprises not incrementing the preamble transmission counter based on: the number of listen before talk failures being substantially equal to zero;

and the one or more configuration parameters comprising the one or more listen before talk failure detection parameters.

Clause 44. The method of any one of clauses 24 to 43, wherein the number of listen before talk failures is less than the plurality of repetitions of the first preamble.

Clause 45. The method of clause 44, wherein determining further comprises not incrementing the preamble transmission counter based on: the number of listen before talk failures being less than the plurality of repetitions of the first preamble; and the one or more configuration parameters comprising the one or more listen before talk failure detection parameters.

Clause 45. The method of clause 44, wherein determining further comprises not incrementing the preamble transmission counter based on: the number of listen before talk failures being equal to the plurality of repetitions of the first preamble; and the one or more configuration parameters comprising the one or more listen before talk failure detection parameters.

Clause 46. An apparatus comprising one or more processors and memory storing instructions that, when executed by the one or more processors, cause the apparatus at least to perform the method according to any one of clauses 1 to 45.

Clause 47. A non-transitory computer-readable medium comprising instructions that, when executed by one or more processors of a device, cause the device to perform the method according to any one of clauses 1 to 45.

Clause 48. An apparatus comprising means for performing the method according to any one of clauses 1 to 45.

Clause 49. An apparatus comprising circuitry configured to perform the method according to any one of clauses 1 to 45.

Clause 50. A computer program product encoding instructions for performing the method according to any one of clauses 1 to 45.

What is claimed is:

1. A method comprising:
   determining, by a wireless device, a first plurality of repetitions of a first preamble scheduled for transmission for a random-access procedure;
   suspending, by the wireless device, a power-ramping counter of the random-access procedure based on not transmitting each repetition of the first plurality of repetitions of the first preamble of the random-access procedure; and
   transmitting, by the wireless device, a second preamble with a transmit power that is determined based on the power-ramping counter for the random-access procedure.

2. The method of claim 1, wherein not transmitting each repetition of the first plurality of repetitions is based on failing to transmit each repetition of the first plurality of repetitions of the first preamble.

3. The method of claim 1, further comprising receiving, by the wireless device, one or more configuration parameters.

4. The method of claim 3, wherein the one or more configuration parameters comprise one or more broadcast configuration parameters.

5. The method of claim 3, wherein the one or more configuration parameters indicate one or more reference signals.

6. The method of claim 5, further comprising determining the first plurality of repetitions based on a radio link quality of a reference signal of the one or more reference signals.

7. A wireless device, comprising:

one or more processors; and memory storing instructions that, when executed by the one or more processors, cause the wireless device at least to perform:

determining, by a wireless device, a first plurality of repetitions of a first preamble scheduled for transmission for a random-access procedure;

suspending, by the wireless device, a power-ramping counter of the random-access procedure based on not transmitting each repetition of the first plurality of repetitions of the first preamble of the random-access procedure; and transmitting, by the wireless device, a second preamble with a transmit power that is determined based on the power-ramping counter for the random-access procedure.

8. The wireless device of claim 7, wherein the instructions further cause the wireless device at least to perform incrementing a preamble transmission counter.

9. The wireless device of claim 8, wherein incrementing the preamble transmission counter is based on the wireless device not receiving a random-access response corresponding to the first preamble.

10. The wireless device of claim 9, wherein incrementing the preamble transmission counter is further based on not receiving the random-access response corresponding to the first preamble within a time window.

11. The wireless device of claim 10, wherein the time window is a random-access response window.

12. The wireless device of claim 7, wherein the instructions further cause the wireless device at least to perform incrementing the power-ramping counter based on transmitting at least one repetition of a second plurality of repetitions of a third preamble of the random-access procedure.

13. The wireless device of claim 12, wherein the instructions further cause the wireless device at least to perform transmitting a fourth preamble with a transmit power based on the power-ramping counter.

14. The wireless device of claim 13, wherein the transmit power of the fourth preamble is based on the incrementing the power-ramping counter.

15. A non-transitory computer-readable medium comprising instructions that, when executed by one or more processors of a device, cause the device to perform a process, the process comprising:

determining, by a wireless device, a first plurality of repetitions of a first preamble scheduled for transmission for a random-access procedure;

suspending, by the wireless device, a power-ramping counter of the random-access procedure based on not transmitting each repetition of the first plurality of repetitions of the first preamble of the random-access procedure; and transmitting, by the wireless device, a second preamble with a transmit power that is determined based on the power-ramping counter for the random-access procedure.

16. The non-transitory computer-readable medium of claim 15, the process further comprising receiving, by the wireless device, one or more configuration parameters.

17. The non-transitory computer-readable medium of claim 15, the process further comprising:

receiving, by the wireless device, one or more configuration parameters, wherein the one or more configuration parameters indicate one or more reference signals; and determining the first plurality of repetitions based on a radio link quality of a reference signal of the one or more reference signals.

18. The non-transitory computer-readable medium of claim 15, the process further comprising incrementing a preamble transmission counter, wherein incrementing the preamble transmission counter is based on the wireless device not receiving a random-access response corresponding to the first preamble.

19. The non-transitory computer-readable medium of claim 15, the process further comprising incrementing a preamble transmission counter, wherein incrementing the preamble transmission counter is based on the wireless device not receiving a random-access response corresponding to the first preamble within a random-access response window.

20. The non-transitory computer-readable medium of claim 15, the process further comprising:

incrementing the power-ramping counter based on transmitting at least one repetition of a second plurality of repetitions of a third preamble of the random-access procedure; and transmitting a fourth preamble with a transmit power based on the power-ramping counter, wherein the transmit power of the fourth preamble is based on the incrementing the power-ramping counter.

* * * * *